United States Patent
Sandler et al.

(10) Patent No.: US 8,872,014 B2
(45) Date of Patent: Oct. 28, 2014

(54) MULTI-MEDIA SPATIAL CONTROLLER HAVING PROXIMITY CONTROLS AND SENSORS

(71) Applicant: Beamz Interactive, Inc., Scottsdale, AZ (US)

(72) Inventors: Dave Sandler, Saint James, NY (US); Cody Myer, Tempe, AZ (US); Gerald H. Riopelle, Scottsdale, AZ (US)

(73) Assignee: Beamz Interactive, Inc., Scottsdale, AZ (US)

( * ) Notice: Subject to any disclaimer, the term of this patent is extended or adjusted under 35 U.S.C. 154(b) by 149 days.

(21) Appl. No.: 13/689,389

(22) Filed: Nov. 29, 2012

(65) Prior Publication Data

US 2013/0138233 A1    May 30, 2013

Related U.S. Application Data

(60) Continuation-in-part of application No. 12/381,645, filed on Mar. 13, 2009, which is a continuation-in-part (Continued)

(51) Int. Cl.
*G10H 7/00*    (2006.01)
*G06F 17/00*   (2006.01)

(Continued)

(52) U.S. Cl.
CPC .......... *G06F 17/00* (2013.01); *G10H 2210/371* (2013.01); *G10H 2220/305* (2013.01);

(Continued)

(58) Field of Classification Search
CPC .............. G10H 1/0066; G10H 1/0058; G10H 2240/311; G10H 1/34; G10H 2240/056; G10H 2220/411; G10H 2220/415; G10H 1/0083; G10H 13/06; G10H 2220/155; G10H 2220/206; G10H 2220/421; G10H 2240/171; G10H 2240/021; G06F 3/0325

See application file for complete search history.

(56) References Cited

U.S. PATENT DOCUMENTS 2,314,038 A   3/1943   Elting
3,076,953 A   2/1963   Sloop (Continued)

FOREIGN PATENT DOCUMENTS

FR   2502823   10/1982
FR   2590033   5/1987

(Continued)

OTHER PUBLICATIONS

Thru-beam fork sensor, Archive Press Release, Balluff, Inc. published on http://newsthomasnet.com/fullstory/9366/3919 (Mar. 20, 2002).

(Continued)

*Primary Examiner* — Marlon Fletcher
(74) *Attorney, Agent, or Firm* — Robert C. Klinger

(57) ABSTRACT

A controller having proximity sensors associated with a trigger, such as beam sensors, configured to generate proximity data as a function of where each beam is broken along its span. A variety of control signals are be generated, whereby each beam can be configured to be spatially controlled and mapped to mimic other controllers, such as those of a DJ controller or other entertainment device. MIDI messages may be generated in response to positioning a member in a beam as detected by the proximity sensors. Each beam may be configured into a plurality of proximity zones, where a different MIDI message is generated when the member is positioned in the respective proximity zone.

34 Claims, 23 Drawing Sheets

Related U.S. Application Data of application No. 11/112,004, filed on Apr. 22, 2005, now Pat. No. 7,504,577, which is a division of application No. 10/219,821, filed on Aug. 16, 2002, now Pat. No. 6,960,715.

(60) Provisional application No. 61/593,828, filed on Feb. 1, 2012, provisional application No. 61/617,469, filed on Mar. 29, 2012, provisional application No. 60/312,843, filed on Aug. 16, 2001.

(51) Int. Cl.
  *G10H 1/00* (2006.01)
  *G10H 1/38* (2006.01)
  *G10H 1/20* (2006.01)
  *G10H 1/34* (2006.01)
  *H04S 3/00* (2006.01)

(52) U.S. Cl.
  CPC .... *G10H 2220/415* (2013.01); *G10H 2220/421* (2013.01); *G10H 2240/061* (2013.01); *G10H 2250/435* (2013.01); *G10H 1/0066* (2013.01); *G10H 1/38* (2013.01); *G10H 2240/211* (2013.01); *G10H 1/20* (2013.01); *G10H 2220/135* (2013.01); *G10H 2230/015* (2013.01); *G10H 2240/255* (2013.01); *H04S 3/008* (2013.01); *G10H 1/34* (2013.01); *G10H 2240/321* (2013.01); *G10H 2240/285* (2013.01)
  USPC ............. 84/645; 84/609; 84/615; 84/622; 84/649; 84/653; 84/659; 84/723; 84/725; 84/735

(56) References Cited

U.S. PATENT DOCUMENTS

| | | | |
|---|---|---|---|
| 3,733,953 A | 5/1973 | Ferber | |
| 3,749,810 A | 7/1973 | Dow | |
| 3,936,134 A | 2/1976 | Piscionere, Sr. | |
| 4,688,460 A | 8/1987 | McCoy | |
| 4,736,662 A | 4/1988 | Yamamoto | |
| 4,968,877 A | 11/1990 | McAvinney et al. | |
| 4,974,482 A | 12/1990 | Tamaki et al. | |
| 5,017,770 A | 5/1991 | Sigalov | |
| 5,045,687 A | 9/1991 | Gurner | |
| 5,081,896 A | 1/1992 | Hiyoshi et al. | |
| 5,085,119 A | 2/1992 | Cole | |
| 5,369,270 A | 11/1994 | Gurner et al. | |
| 5,414,256 A | 5/1995 | Gurner et al. | |
| 5,442,168 A | 8/1995 | Gurner et al. | |
| 5,459,312 A | 10/1995 | Gurner et al. | |
| 5,475,214 A | 12/1995 | DeFranco et al. | |
| 5,668,333 A | 9/1997 | Horton et al. | |
| 5,790,124 A | 8/1998 | Fischer et al. | |
| 5,804,750 A | 9/1998 | Shirakawa et al. | |
| 5,989,120 A | 11/1999 | Truchsess | |
| 5,990,409 A | 11/1999 | Takahashi et al. | |
| 5,998,727 A | 12/1999 | Toba et al. | |
| 6,142,849 A | 11/2000 | Horton et al. | |
| 6,153,822 A | 11/2000 | Toba et al. | |
| 6,175,074 B1 | 1/2001 | Takahashi et al. | |
| 6,489,550 B1 | 12/2002 | Takahashi | |
| 6,492,775 B2 | 12/2002 | Klotz et al. | |
| 6,501,012 B1 | 12/2002 | Toba et al. | |
| 6,663,491 B2 | 12/2003 | Watabe et al. | |
| 6,685,480 B2 | 2/2004 | Nishimoto et al. | |
| 6,738,044 B2 | 5/2004 | Holzrichter et al. | |
| 6,755,713 B1 | 6/2004 | Weber et al. | |
| 6,788,295 B1 | 9/2004 | Inkster | |
| 6,794,568 B1 | 9/2004 | Callaway | |
| 6,919,503 B2 | 7/2005 | Nishitani et al. | |
| 6,960,715 B2 * | 11/2005 | Riopelle | 84/725 |
| 7,402,743 B2 * | 7/2008 | Clark et al. | 84/615 |
| 7,504,577 B2 * | 3/2009 | Riopelle | 84/723 |
| 8,519,252 B2 * | 8/2013 | Haddad | 84/724 |
| 2002/0097472 A1 | 7/2002 | Oettinger et al. | |
| 2002/0170413 A1 * | 11/2002 | Nishitani et al. | 84/600 |
| 2003/0110929 A1 | 6/2003 | Riopelle | |
| 2005/0202890 A1 | 9/2005 | Otten et al. | |
| 2005/0202891 A1 | 9/2005 | Otten et al. | |
| 2005/0202892 A1 | 9/2005 | Otten et al. | |
| 2005/0202893 A1 | 9/2005 | Otten et al. | |
| 2005/0223330 A1 | 10/2005 | Riopelle | |
| 2005/0241466 A1 * | 11/2005 | Riopelle | 84/725 |
| 2007/0000374 A1 * | 1/2007 | Clark et al. | 84/724 |
| 2007/0146347 A1 | 6/2007 | Rosenberg | |
| 2008/0311969 A1 | 12/2008 | Kay et al. | |
| 2009/0221369 A1 * | 9/2009 | Riopelle | 463/35 |
| 2011/0041671 A1 * | 2/2011 | Moffatt | 84/610 |
| 2012/0234161 A1 * | 9/2012 | Haddad | 84/724 |
| 2013/0138233 A1 * | 5/2013 | Sandler et al. | 700/94 |
| 2013/0340597 A1 * | 12/2013 | Haddad | 84/724 |
| 2014/0076127 A1 * | 3/2014 | Haddad | 84/724 |

FOREIGN PATENT DOCUMENTS

| | | |
|---|---|---|
| JP | S63-503167 | 4/1987 |
| JP | 2714455 | 5/1991 |
| JP | 3127597 | 3/1994 |
| JP | H07-55598 | 12/1995 |
| JP | 2006 145583 A | 6/2006 |
| KR | 2012 0009151 A | 2/2012 |

OTHER PUBLICATIONS

"DirectMusic Producer" printouts from www.msdn.microsoft.com Microsoft Corporation.
"PM128 Midibuddy Midi Controller", owners manual, Mar. 1998.
Alesis QSR Reference Manual DrumKAT Turbo Guide. DrumKAT Turbo Guide; drumKAT 3.5 Manual Sep. 1996.
Mountain Glen Harps: "Laser Midi Harps" http://web.archive.org/web/20071010002846/www.mountainglenharps.com/laser.html (Nov. 20, 2007).
Kilpatrick, Andrew: "Laser Harp", http://web.archive.org/web/20080801034925/http://www.andrewkilpatrick.org/blog/?pag_id=170 (Aug. 1, 2008).
International Search Report dated Mar. 25, 2014 in connection with International Patent Application No. PCT/US2013/071308, 5 pages.
Written Opinion of International Searching Authority dated Mar. 25, 2014 in connection with International Patent Application No. PCT/US2013/071308, 8 pages.

* cited by examiner

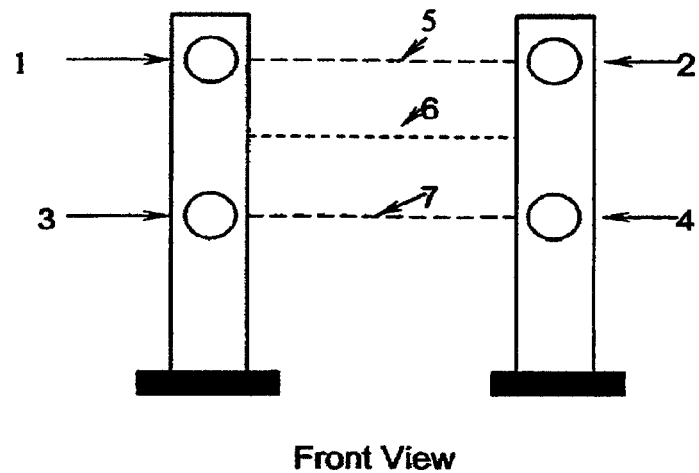
Front View
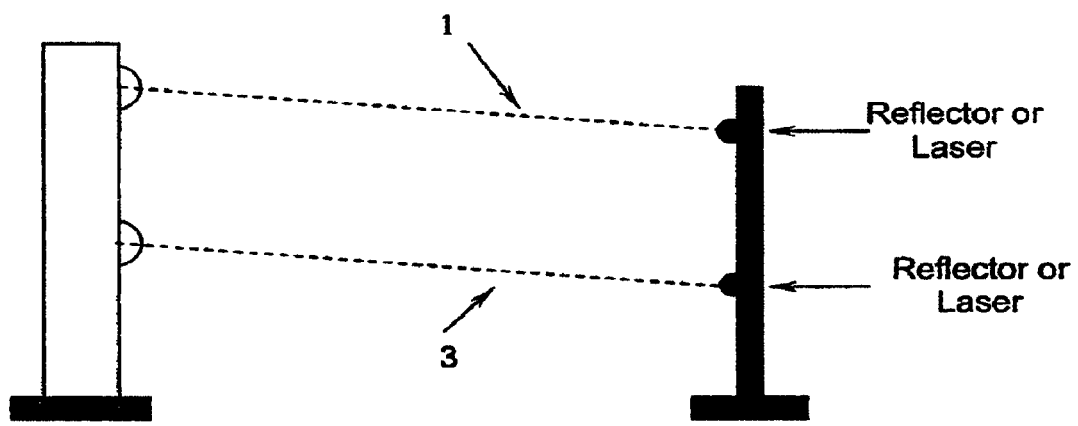
Side View
Figure 8

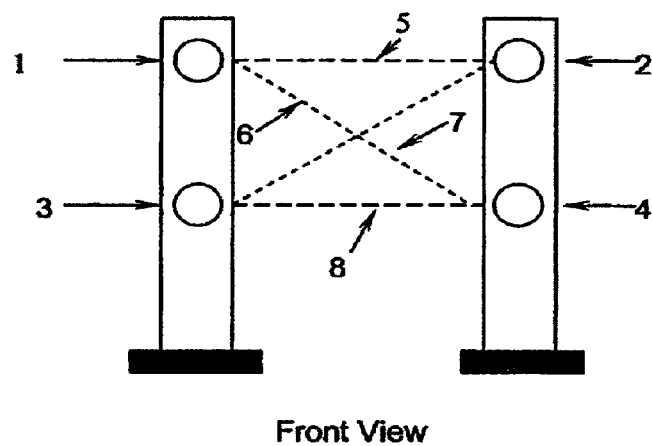
Front View
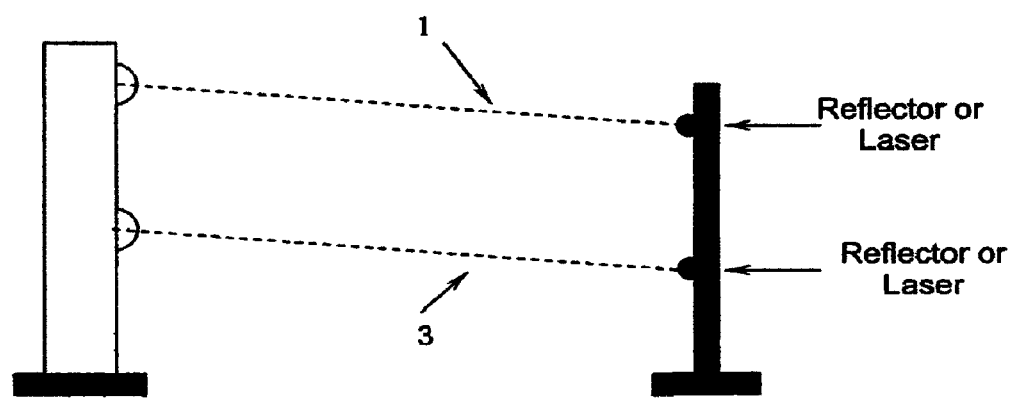
Side View
Figure 9

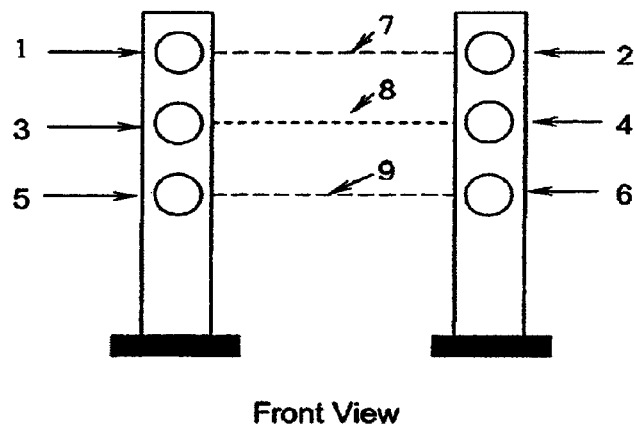
Front View
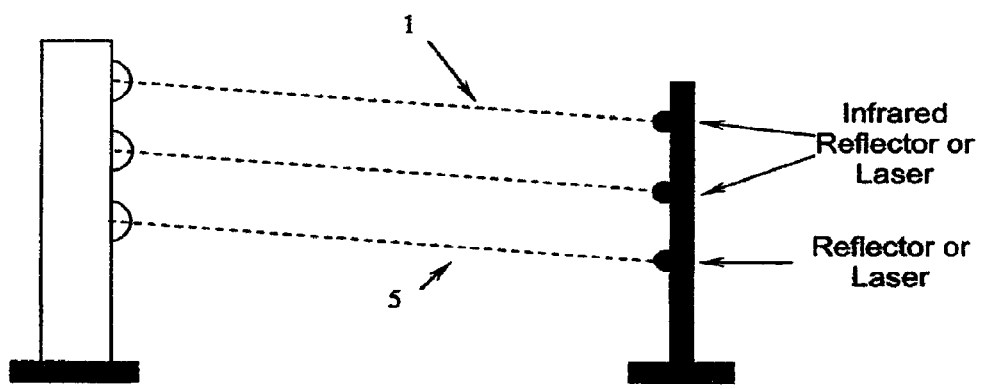
Side View
Figure 10

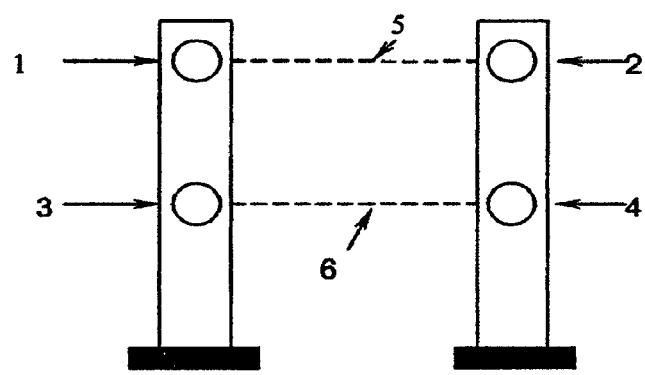
Front View
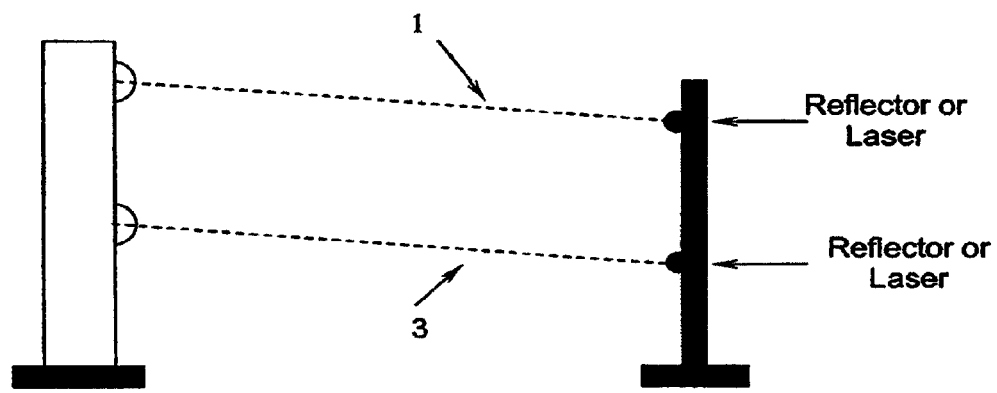
Side View
Figure 11

US 8,872,014 B2

MULTI-MEDIA SPATIAL CONTROLLER HAVING PROXIMITY CONTROLS AND SENSORS

CLAIM OF PRIORITY

This application claims priority to U.S. provisional patent application Ser. No. 61/593,828 filed Feb. 1, 2012 entitled "DJ Controller" and U.S. Provisional Patent Application Ser. No. 61/617,469 filed Mar. 29, 2012 entitled "DJ Controller", the teachings of which are included herein by reference, and is a Continuation-in-Part of U.S. patent application Ser. No. 12/381,645 filed Mar. 13, 2009 entitled "Video Game Controller", which application is a Continuation-in-Part of U.S. patent application Ser. No. 11/112,004 filed Apr. 22, 2005 entitled "Music Instrument System and Methods", now issued as U.S. Pat. No. 7,504,577 B2, which application is a divisional of, and claims the benefit of, U.S. patent application Ser. No. 10/219,821 filed Aug. 16, 2002 entitled "Music Instrument System and Method", now issued as U.S. Pat. No. 6,960,715 B2, which application is related to and claims the benefit of U.S. Provisional Patent Application Ser. No. 60/312,843, filed Aug. 16, 2001, entitled "Music Instrument System and Method". This application is also related to U.S. Pat. No. 7,858,870 B2 entitled "System and Methods for the Creation and Performance of Sensory Stimulating Content" which is also a Continuation-in-Part of U.S. patent application Ser. No. 10/219,821 filed Aug. 16, 2002 entitled "Music Instrument System and Method", now issued as U.S. Pat. No. 6,960,715 B2. The teachings of these related applications are incorporated herein by reference in their entirety.

FIELD OF INVENTION

This invention relates to a multi-media controller, and more particularly a controller configured to generate control signals enabling a multi-media performance by an entertainer.

BACKGROUND

Multi-media controllers continue to advance in the art. Such controllers may comprise of a DJ controller configured to control audio programs, as well as visual devices including lighting apparatus and graphic/video displays. Conventional controllers are limited in nature due to their mechanical controls and limited dramatic nature. An advanced controller configured to provide a more dramatic and enhanced performance would be appreciated by performers of various types, such as those that can be utilized in a performance venue.

SUMMARY OF INVENTION

The present invention achieves technical advantages as a controller having proximity sensors associated with the beam sensors, configured to generate proximity data as a function of where each beam is broken along its span. A variety of control signals can be generated, whereby the beams can be configured to be spatially controlled controls and mimic other controllers, such as those of a DJ controller or other entertainment device. MIDI messages may be generated in response to beam and proximity sensors.

BRIEF DESCRIPTION OF THE FIGURES

FIG. 8 provides front and side elevational views of an alternate sensor post and sensor beam arrangement preferably comprising seven sensor beams according to a preferred embodiment of the present invention;

FIG. 9 provides front and side elevational views of an alternate sensor post and sensor beam arrangement preferably comprising eight sensor beams according to a preferred embodiment of the present invention;

FIG. 10 provides front and side elevational views of an alternate sensor post and sensor beam arrangement preferably comprising nine sensor beams according to a preferred embodiment of the present invention;

FIG. 11 provides front and side elevational views of an alternate sensor post and sensor beam arrangement preferably comprising six sensor beams according to a preferred embodiment of the present invention;

FIG. 20 is an example a video jam song preparation and playback process;

DETAILED DESCRIPTION OF THE PREFERRED EMBODIMENT

General MIDI Description

MIDI is an acronym for Musical Instrument Digital Interface. Additional information about MIDI, including technical specifications related thereto, can be obtained on the World Wide Web from the MIDI Manufacturer's Association. It is noted that the difference between MIDI and digital audio is that MIDI is merely performance data which by itself does not produce an audible output of sound. Instead, production of audible sound from MIDI data requires a MIDI instrument. Generally MIDI instruments tend to be of the MIDI synthesizer keyboard or module type, and are considered to be hardware-based synthesizers. However, in addition to the hardware synthesizers, software synthesizers are also available. Such software synthesizers are possible due to the computational power available to modern personal computers. The combination of a personal computer and appropriate synthesizer software can result in a fully capable and fully functional MIDI synthesizer module.

Hardware Description

Reference will now be made in detail to the preferred embodiments of the present invention, examples of which are illustrated in the accompanying drawings.

Figure 1:
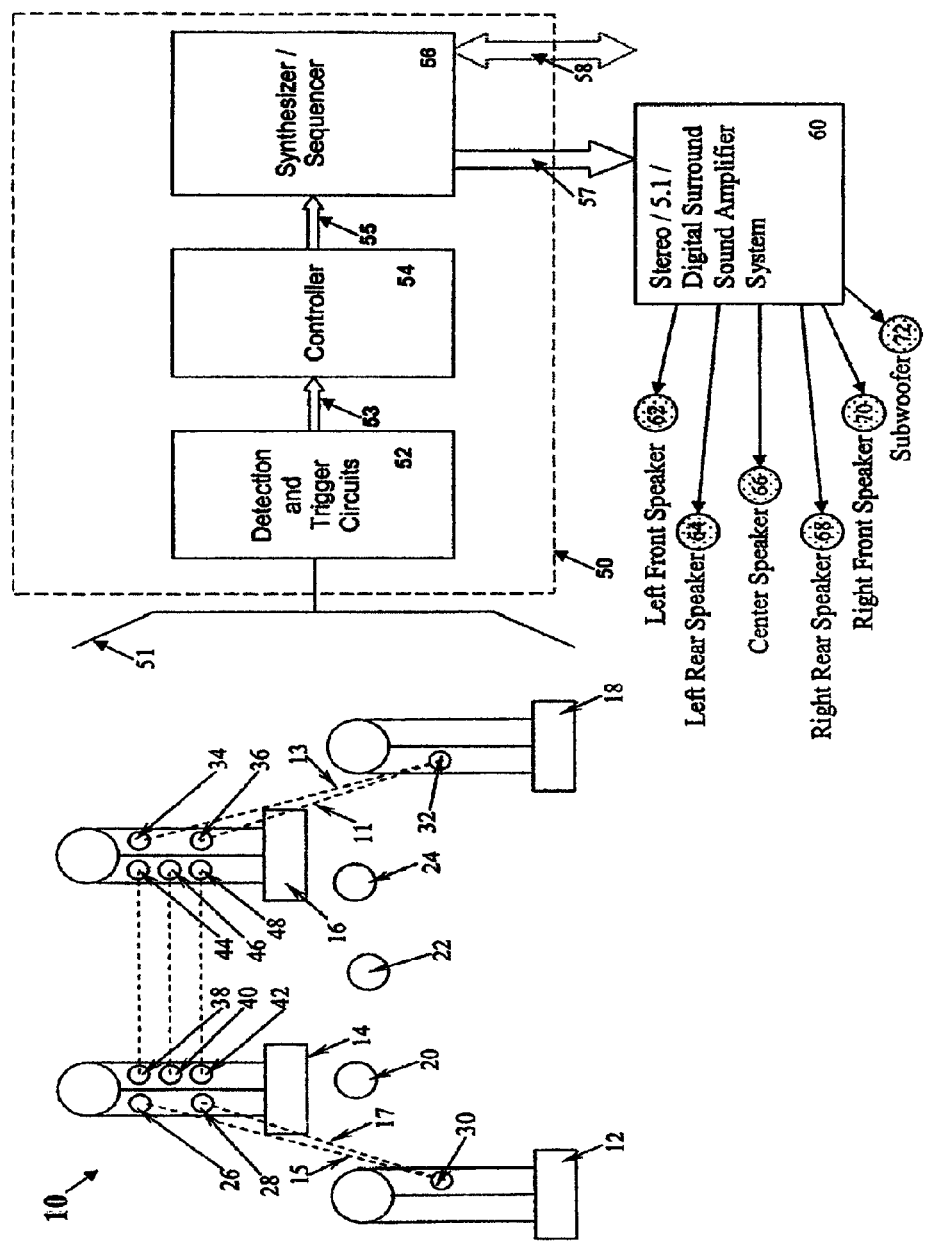
FIG. 1 is a functional block diagram of a music composition and performance system according to a preferred embodiment of the present invention.

FIG. 1 is a functional block diagram of a music composition and performance system, including a music instrument, according to a preferred embodiment of the present invention. As used herein, the term music comprises at least one sound or data used to represent such a sound (collectively "sound"). Such sounds can include, but are not limited to natural sounds, computer-generated sounds, and special sound effects.

The music composition and performance system 10 comprises at least one, and preferably a plurality of, sensor posts, illustrated as sensor post 12, sensor post 14, sensor post 16, and sensor post 18 in FIG. 1. The sensor posts are preferably substantially identical columns placed on, or into, a floor. Each sensor post preferably comprises, either individually or in combination, at least one beam emitter and at least one beam receiver or beam detector. In an alternative embodiment, sensor posts may also include beam reflectors, beam splitters, and other such beam elements. It should be apparent to one skilled in the art that alternative sensor post arrangements, including, but not limited to, sensor posts of various heights, and sensor posts integrated into a physical structure, such as a wall, may be used without departing from the spirit and the scope of the present invention.

Figure 4:
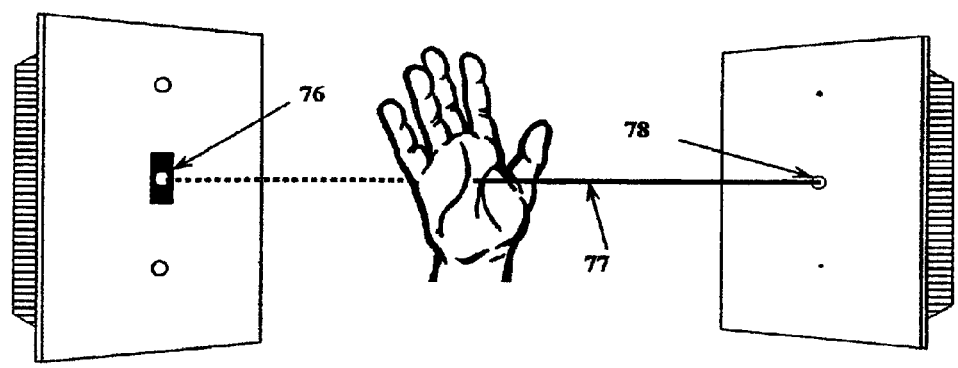
FIG. 4 is a perspective view illustrating a user's hand and a preferred arrangement of a sensor array comprising wall mounted sensor elements according to a preferred embodiment of the present invention.

For example, FIG. 4 provides a perspective view illustrating a user's hand 77 and an alternate sensor post embodiment, in which beam emitters 78, beam receivers 76, beam reflectors, and other such beam elements are mounted into a wall. Alternatively, wall mounted beam elements may be combined with stand-alone sensor posts. In either such arrangement, beam elements might preferably be mounted in one or more walls with sensor beams spanning the distance across a room, hallway, patio, or other such space. Such an arrangement could still preferably be played in substantially the same manner as the sensor post embodiments.

Laser beams are presently a preferred beam type in the present invention, and beam elements geared toward laser beams are presently used in the preferred embodiments of the present invention. Those skilled in the art should appreciate that in appropriate circumstances, other forms of energy generation, manipulation, and detection circuitry may be utilized in preferred embodiments of the present invention, including, but not limited to, infrared beam emitters and detectors, ultrasonic sound generators and receivers, metal detectors, and proximity detectors.

In a sensor post based embodiment, beam emitters, beam receivers, beam reflectors, and other such beam elements in the sensor posts allow the sensor posts to be selectively coupled with one another by one or more sensor beams. As described below, the present invention is designed such that a user may interrupt a sensor beam with a part of their body or some other thin object, such as a drumstick-like object, and the interruption of the sensor beam will cause or enable a function as described below. A feature of the present invention is the enablement of the use of thin objects such as, but not limited to, thin sticks or wands, drumsticks, and one or more user fingers, to interrupt a sensor beam. This feature enables greater and more precise control, or playing/performance, of embodiments of the present invention than systems of the prior art.

FIG. 1 provides an illustrative example of the interrelationship of beam reflectors, beam emitters, and beam receivers embedded within sensor posts. As illustrated in FIG. 1, sensor beam 15 may emit from beam emitter 26, preferably embedded within sensor post 14, and reflect off beam reflector 30, preferably embedded within sensor post 12. By reflecting off of beam reflector 30, sensor beam 15 can create sensor beam 17, which can be received by beam receiver 28, preferably also embedded within sensor post 14. A user may interrupt the path of sensor beam 15 and/or sensor beam 17 by moving an object, such as part of their body or a drumstick, through the beam.

FIG. 1 can also be seen as illustrating an alternative embodiment of the present invention. In accordance with this embodiment, sensor posts 12 and 18 preferably include reflectors 30 and 32, respectively. Sensor post 14 preferably comprises two beam elements 26 and 28. Beam elements 26 and 28 are preferably comprised of both beam emitters and beam sensors. Beam elements 26 and 28 can emit sensor beams 15 and 17, respectively, that reflect off reflector 30 such that sensor beams 15 and 17 are received by beam receivers within beam elements 26 and 28, respectively. Similarly, sensor post 16 preferably comprises two beam elements 34 and 36. Beam elements 34 and 36 emit sensor beams 11 and 13, respectively, that reflect off reflector 32 such that sensor beams 11 and 13 are received by the beam receivers within beam elements 34 and 36.

It should be noted that, in a preferred embodiment, sensor beams 11, 13, 15 and 17 have a descending aspect of approximately one inch down for each foot of horizontal space between the sensor posts. This feature enables a user to position themselves in an optimum playing location relative to the motions required to interrupt sensor beams 11, 13, 15 and 17. This feature also enhances the ability of a user in a wheelchair, or in any chair, to play system 10. Also, small children may find the system 10 easier to play due to the downward angle of the side sensor beams 11, 13, 15 and 17. Alternatively, beam reflectors 30 and 32, and beam elements 26, 28, 34, and 36, may be mounted to their respective sensor posts by a mounting means which allows their height to be adjusted to better accommodate one or more performers of various height.

FIG. 1 further illustrates that sensor post 14 preferably also comprises three beam elements 38, 40, and 42, and sensor post 16 preferably also comprises reflectors 44, 46, and 48. Beam elements 38, 40, and 42 preferably emit sensor beams 21, 23, and 25, respectively that reflect off reflectors 44, 46, and 48 such that sensor beams 21, 23, and 25 are received by one or more beam receivers preferably associated with the respective beam emitter in beam elements 38, 40, and 42. It should be noted that the present invention positions sensor beams 11, 13, 15, 17, 21, 23, and 25 such that the interruption of the sensor beams by a user's body movements is a very natural process fitting the natural movements of a user's body.

Although the above description discusses preferred arrangements and numbers of sensor posts and beam elements, those skilled in the art will recognize that, under appropriate circumstances, other numbers and arrangements of sensor posts, beam elements, and the like may be utilized without departing from the spirit or the scope of the present invention. For example, reflectors 44, 46, and 48 may be replaced with a combination of beam emitters and beam detectors. In such an alternative arrangement, a sensor beam emitted by beam element 38 may be received by beam element 44, and a sensor emitted by beam element 44 may be received by beam element 38. This arrangement can be repeated for each beam element. Such an arrangement can effectively double the number of sensor beams, which may allow for greater or more precise control of the present invention. In addition, alternative beam angles can be used, such that beam element 38 would emit a beam that was received by beam element 46 and/or beam element 48. Furthermore, varying numbers of sensor beams may be utilized in alternate embodiments. Some such alternate embodiments are described in more detail below.

A preferred embodiment of system 10 also includes foot switches 20, 22, and 24. In one embodiment, the foot switches are comprised of a MIDIBUDDY MIDI Controller, Model MP 128, which is manufactured by RFX Corporation of Salt Lake City Utah. A MIDIBUDDY MIDI Controller comprises a plurality of foot switches, with Model MP 128 having twelve foot switches. The MIDIBUDDY MIDI Controller is programmable, and capable of sending MIDI program change information to any MIDI controllable device when one or more of the foot switches are activated. In this embodiment, the MIDIBUDDY MIDI Controller sends program change information to controller 54. Information on interfacing with and controlling the MIDIBUDDY MIDI Controller can be found in the MP MIDIBUDDY MIDI CONTROLLER manual, published by RFX Corporation, the teachings and contents of which are included by reference herein in their entirety.

Although this specification makes reference to foot switches, it should be apparent to one skilled in the art that other switches, such as, but not limited to, hand switches, proximity switches, beam switches, and the like may be utilized herein without departing from the spirit or the scope of the invention. Individual or collective interruption of sensor beams 11, 13, 15, 17, 21, 23, or 25 or, optionally, activation of foot switch 20, 22, or 24, will generate one or more control, or trigger, signals 51 that can be coupled to sound data generator system 50. Control or trigger signals 51 can be coupled to sound data generator system 50 through a variety of both wireless and/or wired means, including, but not limited to, traditional single or multi-channel electrical cables, such as parallel or Universal Serial Bus (USB) cables; fiber optic cables; infrared data transmissions; and radio frequency data transmissions using the BlueTooth standard or the Institute of Electrical and Electronics Engineers (IEEE) 802.11 family of wireless communication standards; as well as wireless communications means capable of transmitting data over a larger distance. Those skilled in the art will appreciate that the method of coupling may vary under appropriate circumstances.

Sound data generator system 50 preferably comprises software and/or hardware that enables features of producing, storing, and outputting sound data. Such sound data may include musical data, nature sound data, special sound effects data, and the like. By way of example, without intending to limit the present invention, such sound data may include portions of or entire musical compositions, water noises, wind noises, animal noises, artificial "electronic" sounds, and the like.

Sound data generator system 50 is preferably comprised of detection and trigger circuitry 52, controller 54, and synthesizer/sequencer 56. Detection and trigger circuitry 52 processes control, or trigger, signal(s) 51 from sensor beams 11, 13, 15, 17, 21, 23, and 25 and foot switches 20, 22 and 24. Detection and trigger circuitry 52 outputs a controller input signal 53 into controller 54 based on such control signals 51. Controller 54 preferably comprises electronic circuitry, preferably with its own software controlling its functions, that receives controller input signal 53 from detection and trigger circuitry 52, and converts it into an appropriate, configurable, control signal 55 for input to synthesizer/sequencer 56. In a preferred embodiment of the present invention, synthesizer/sequencer 66 preferably comprises a MIDI synthesizer (also known as a sound module), or a sequencer, and control signal 55 is a MIDI control signal.

By way of an example, without intending to limit the present invention, one embodiment of the present invention utilizes a DrumKAT Controller, manufactured by Alternate Mode, Inc, of Chicopee, Mass., running the TURBO DrumKAT operating system 4.5 or greater as controller 54. DrumKAT Controllers are velocity-sensitive MIDI controllers designed to couple drum pads or other percussion instruments into a MIDI system, synthesizer, sound module, and the like.

Use of a DrumKAT Controller in such an embodiment can provide several advantages, including giving controller 54 as many as 9 trigger inputs and the capability of linking up to 3 of them to each other or to 9 other internal triggers. This offers the possibility of playing up to 384 notes by breaking any one beam. Although such long note groups may be desirable in some circumstances, a preferred embodiment of the present invention allows a performer to play from 1 note (called simple mode) to 4 notes each time a particular beam is broken. Each note can have its own gate time (ranging from 5 milliseconds to 6.4 seconds in the DrumKAT Controller). In addition, performers can choose alternating 8, 24, or 128 note groups. It is also possible to load sequences from a MIDI sequencer into controller 54's sequence player and trigger the sequence on and/or off by breaking a beam. The sequence can also be "sliced" and played 1 note at a time allowing for an extremely long note stream if desired.

The preferred use of a DrumKAT Controller as controller 54 also provides system 10 with 2 MIDI input jacks and 2 MIDI output jacks. These jacks allow controller 54 to serve as a powerful MIDI mapper and to control anything that has a MIDI input, including, but not limited to, synthesizers, samplers, drum machines, sequencers, transcription software on personal computers, and the like. In addition, the MIDI output features can be simultaneously connected to an array of instruments, thus permitting controller 54 to control the entire instrument bank simultaneously by breaking the beams. By also connecting foot switches 20, 22, and 24 to controller 54, a performer can control not only which device or devices is controlled by controller 54, but also change the programs, notes, sounds, and other parameters selected on the instruments.

A preferred DrumKAT Controller based embodiment also allows the polyphony, or number of simultaneously played notes, sounds, or the like, to be adjusted from 1 note to as many as 4 notes. Embodiments based on other systems, such as a software-based system, may permit even more polyphony. This allows each note to continue to sound as subsequent notes are played, as opposed to clipping or switching off the notes, so that sustained chords can be played. The DrumKAT Controller also provides 8 levels of transpose, which can be assigned to one or more beams so that when a transpose beam is broken, all beams (or specified beams) are transposed at the same time (including any notes on the transpose beam itself). There is also a reverse feature that lets melodies be played in reverse, and a mode that allows for programmed panning and volume changes, as well as a control path mode that can accesses any MIDI controller function. System 10 also supports a notation mode, which allows a performer to store and copy music generated by the present invention in a computer. Additional control features of a DrumKAT Controller based embodiment can be found in DrumKAT Turbo 4.0-4.5 Guide; and DrumKAT 3.5 Manual, Rev. 9/96, both published by Alternate Mode Inc., the teachings of which are incorporated herein by reference in their entirety.

Those skilled in the art will recognize that, under appropriate circumstances, other controllers, including custom-made controllers and controllers made by different manufacturers, may be substituted for the DrumKAT Controller without departing from the spirit or the scope of the present invention. Further, although the DrumKAT Controller utilized herein accepts nine independent trigger inputs which are coupled to detection and trigger circuits 52, those skilled in the art should recognize that, under appropriate circumstances, additional or alternative controller 54 units may be incorporated into system 10 to accommodate more than nine trigger inputs.

In basic terms, the present invention uses controller 54 to translate trigger pulses from the sensor beams into events which are sent to synthesizer/sequencer 56 via an Output port. Events received by controller 54 can comprise musical notes, such as those stored in MIDI, format and control information that will be sent to synthesizer/sequencer 56 over a designated control channel. Information sent from controller 54 to synthesizer/sequencer 56 may comprise event information, designated channel information, selected voice, and other such control information. When synthesizer/sequencer 56 receives information from controller 54, synthesizer/sequencer 56 may either play a note against one of it's internal synthesizer voices, or it can play a custom-made audio sample from an external source, such as a Flash-RAM card, CD-ROM, or the like.

One embodiment of the present invention employs an Alesis QSR 64 Voice Expandable Synthesizer Module, manufactured by Alesis of Santa Monica, Calif., as synthesizer/sequencer 56. The Alesis QSR 64 is preferred in such an embodiment, as it comprises the features of a sequencer and synthesizer without having an attached keyboard, thus reducing the overall spatial requirements of this embodiment. The Alesis QSR 64 has several unique features which make it preferable for use in the present invention, including a library of over 1000 quality musical voices and programmable effects; 4 audio outputs, which are useful for polyphonic, and especially quadraphonic, imaging; and the ability to play custom samples from optional Flash RAM cards, with each flash card currently capable of holding a total of over 8 MB of samples. The current version of the Alesis QSR 64 also supports up to 64 simultaneous voices (future models may have a greater number), and can make over 500 programs and 500 mixes available, which can result in an extremely large number of different sounding programs. Providing sample playback and imaging qualities is advantageous for providing environments-based programs. This, in turn, allows the present invention to utilize a host of animal and environment samples, for instance, original samples not available on any other synthesizer available today. The availability of such different sounds is a staple of the present invention.

In a hardware-based embodiment, voltage that comes from a beam switch is sent to a trigger-to-MIDI converter. Many such converters are currently available, including converters from manufacturers such as Yamaha and Roland. Unfortunately, current trigger-to-MIDI converters are limited in their use with the present invention, and an alternative, software-based trigger-to-MIDI converter has been developed as part of the present invention. Although a software-based trigger-to-MIDI converter is described herein and is presently preferred, the present invention will focus on the use of currently available trigger-to-MIDI converters in the description of a preferred embodiment for ease of reference. A preferable trigger-to-MIDI controller unit, the DrumKAT, unit is made by Alternate Modes. Some features of this controller work well for controlling the signals from the beams and assigning the melody streams, loops playback, etc.

Coupling sensor beams 11, 13, 15, 17, 21, 23, or 25 and foot switches 20, 22 or 24 to synthesizer/sequencer 56 enables the coupling and control of the sound libraries and programmability features of synthesizer/sequencer 56 to the trigger events generated by the interruption of one or more of the sensor beams 11, 13, 15, 17, 21, 23, or 25 or the foot switches 20, 22 or 24. Although preferred embodiments of the present invention preferably employ one or more Alesis QSR 64s for synthesizer/sequencer 56, those skilled in the art will recognize that under appropriate circumstances, other synthesizers/sequencers, including those by different manufacturers, may be utilized in alternative embodiments of the present invention without departing from the spirit or the scope of the present invention. Further information on the controllable attributes of the Alesis QSR 64 can be found in the QSR Reference Manual published by Alesis of Santa Monica, Calif., the teachings of which are incorporated herein in their entirety.

Synthesizer/sequencer 56 further preferably comprises audio output signals 57 that can be coupled from synthesizer/sequencer 56 out of sound data generator system 50 and input into a sound generation system 60. Audio output signals 57 may comprise digital and/or analog signals. Sound generation system 60 preferably comprises a 5.1 surround sound system, although one skilled in the art should appreciate that sound generation system 60 can alternatively comprise stereo, four channel, Dolby ProLogic™, Dolby Digital™, Digital Theater System (DTS), or other such sound systems as those skilled in the art would find appropriate without departing from the spirit or the scope of the invention. Sound generation system 60 preferably comprises a number of speakers appropriate for the accurate creation and reproduction of audible sound data produced by system 10. In a preferred embodiment, as illustrated in FIG. 1, such speakers preferably comprises a left front speaker 62, a left rear speaker 64, a right front speaker 68, a right rear speaker 70, a center speaker 66, and a subwoofer 72.

System 10 further comprises at least one bi-directional auxiliary control signal pathway 58. Control signal pathway 58 allows system 10 to be coupled to and to control additional synthesizer/sequencers, lighting or other effect systems, additional sound data production processing or storage equipment, and the like.

In one embodiment, system 10 can be placed into an arcade location. Users may walk up and, following an appropriate payment of money, tokens, or the like, system 10 can be played for a predetermined time period. Additionally, as system 10 is played a temporary memory, such as a loop recorder, digital video recorder, or computer memory ("buffer"), may record the user's performance. If desired, when the user has finished his or her performance or at other desired points in time, the user may elect, most likely by paying an additional sum, to have his or her performance transferred to portable media or converted into another format, such as storing the recording on a compact disc in Moving Picture Experts Group (MPEG) video, MPEG Layer 3 (MP3) format, Windows Media Audio (WMA), or another such format. This can allow a user to capture, for his or her own use, a unique musical composition composed by him or her using system 10. Although the terms his and her are used above to refer to a user, the terms should not be construed as limiting the invention to operation by a single performer.

In an alternate embodiment, as will be discussed further below, sound data generator system 50 can comprise a software system running upon a personal computer, laptop computer, portable desktop assistant (PDA), workstation, or other computerized device. One skilled in the art should appreciate that such a system can enable all of the features of controller 54 and synthesizer/sequencer 56, and may also provide additional features as discussed below. Such a system preferably comprises hardware interface components as appropriate to couple sensor beams, sound output equipment, and auxiliary functions to the computer comprising such software system.

Figure 2:
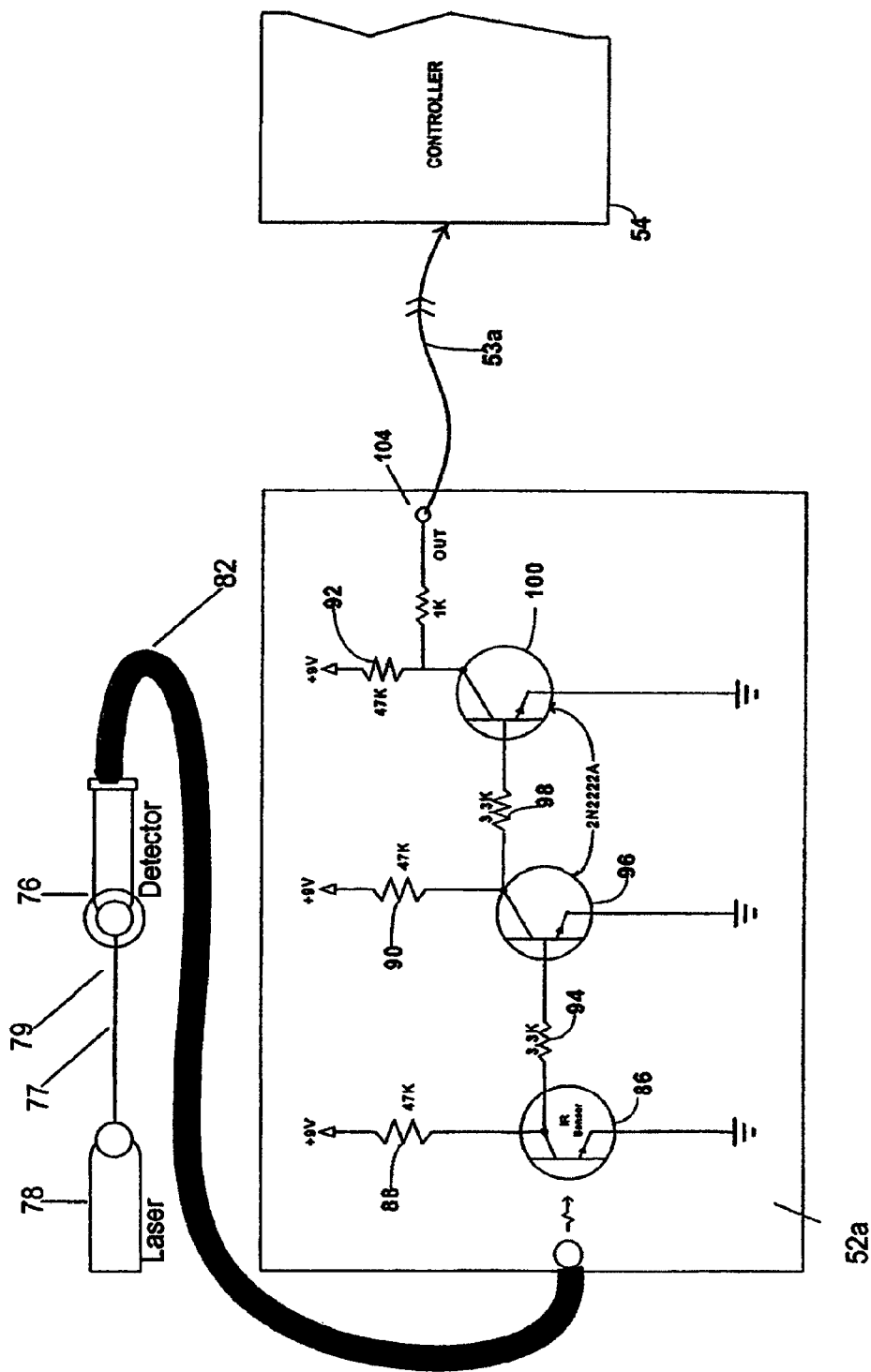
FIG. 2 is a functional block diagram of a preferred motion sensing and trigger circuit system according to a preferred embodiment of the present invention.

FIG. 2 provides a functional block diagram of a preferred motion sensing and trigger circuit system as used in the present invention. A single beam emitter 78 and beam 77, single beam receiver 76, and a single channel of the detection and trigger circuitry 52a are illustrated for the purposes of explanation. It should be apparent to one skilled in the art that alternative numbers of beam emitters, beam receivers, and the like, as well as alternative beam detection and trigger circuitry 52a can be used without departing from the spirit or scope of the present invention.

Figure 5A:
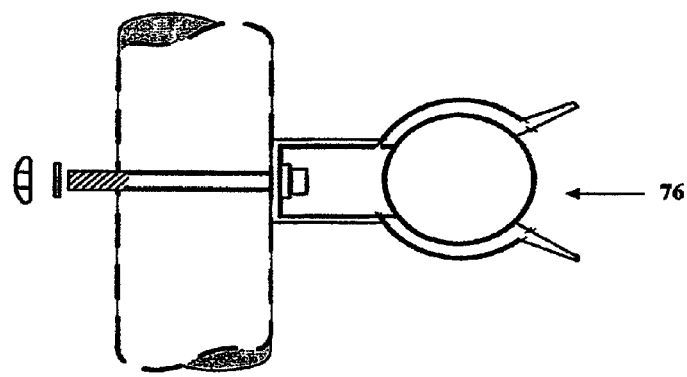
FIGS. 5a, b, c, and d are elevational and sectional views showing details of sensor elements according to a preferred embodiment of the present invention.
Figure 5B:
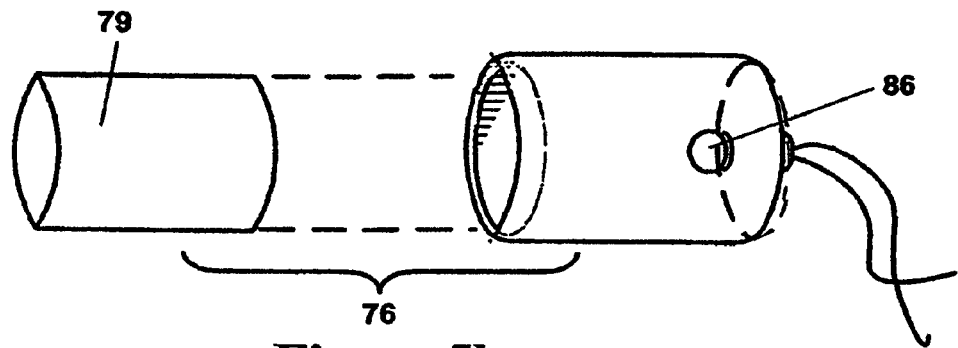
Figure 5C:
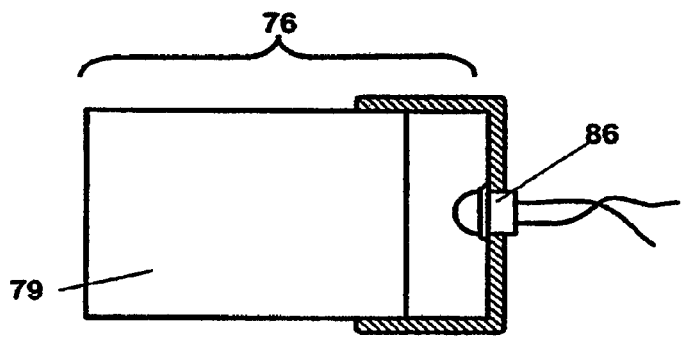
Figure 5D:
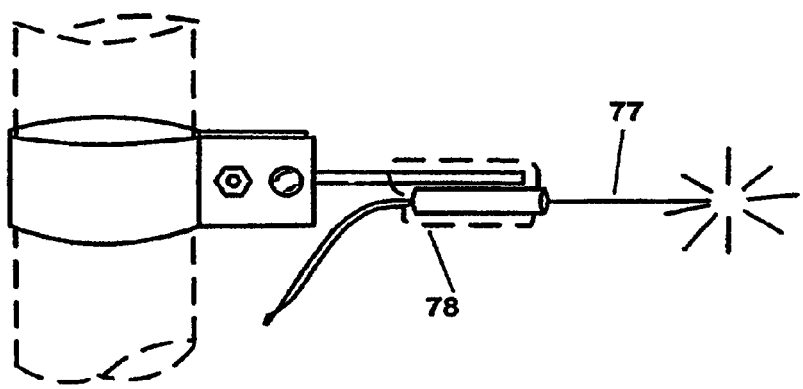

FIGS. 5a-5d illustrate elevational and sectional views of beam elements according to a preferred embodiment of the present invention. As FIGS. 5a and 5d illustrate, beam elements, such as beam emitter 78 and beam detector 76, can be mounted in swivel-type holders, such as "pen trumpets". The mounting of the beam elements into swivel-type holders allows beam 77 to be easily aimed to illuminate, impact, or otherwise excite beam receiver 76. Beam receiver 76 can comprise a beam element, as previously discussed, and beam receiver 76 can also include a beam diffuser 79 coupled to a front surface of beam receiver 76. Beam diffuser 79 typically provides a larger target for beam 77 in comparison to the diameter of beam sensor 86. Thus, by placing beam diffuser 79 on the front of beam receiver 76, beam emitter 78 can be aimed much more easily, as substantially the entire surface diameter of beam diffuser 79 is available as a target. In one embodiment, a diffuser can be made from a segment of fiber optic cable, with one end of the segment roughed up with an abrasive, such as 60-grit sandpaper. Beam 77 is diffused by such roughing. Alternatively, a commercial diffuser lens may be coupled to the front surface of beam receiver 76.

Referring again to FIG. 2, beam receiver 76 is preferably coupled to detection and trigger circuit 52a via an appropriate beam coupler 82. A preferred embodiment utilizes a fiber-optic filament as beam coupler 82. The fiber-optic filament conducts sensor beam 77 from beam receiver 76 to detection and trigger circuit 52a. Detection and trigger circuit 52a is preferably a channel, or sub-circuit, of detection and trigger circuit 52 illustrated in FIG. 1. Detection and trigger circuit 52 should preferably include as many sub-channels as necessary to accommodate all the sensor beams, foot switches, and other user-accessible controls implemented in a particular embodiment. Detection and trigger circuit 52a detects the presence and/or absence of sensor beam 77 and outputs controller-input signal 53a into controller 54. The presence and/or absence of sensor beam 77 may be controlled by a user interrupting sensor beam 77 with a part of his or her body, or some other object, such as a drumstick, wand, baton, hand-held fan, or other object. Alternatively, footswitches or other control devices may be used to enable or disable one or more beam emitters, such that a particular sensor beam 77 is absent or present as desired by a user.

By way of an example of the functions of detection and trigger circuit 52a, without intending to limit the present invention, beam emitter 78 may emit sensor beam 77, which is preferably a laser beam. Sensor beam 77 strikes beam diffuser 79 and enters beam detector 76. Beam detector 76 allows sensor beam to travel through beam coupler 82 to sensor component 86, preferably comprising an infrared ("Ir" hereinafter), or visible light, laser sensor. Such sensor components typically function in a manner similar to a transistor, and sensor component 86 is illustrated as a transistor whose base portion is activated by incoming photons. The collector portion of sensor component 86 is coupled via resistor 94, which is preferably a 3.3K Ohm resistor, to the base portion of transistor 96, which is preferably a 2N222A transistor. The collector portion of transistor 96 is, in turn, coupled via resistor 98, which is preferably a 3.3K Ohm resistor, to the base portion of a second transistor 100, also preferably a 2N222A. The collector portion of transistor 100 is coupled via resistor 102, preferably a 1K Ohm resistor, to output 104. Output 104 can be hardwired to detection and trigger circuit 52a, or output 104 may constitute a wireless or wired communications means, such as a male or female plug, for connecting detection and trigger circuit 52a to one or more devices. Output 104 allows the controller-input signal 53a, generated by detection and trigger circuit 52a, to be transmitted to controller 54. Additionally, as would be understood by those skilled in the art, a power supply preferably supplies +9 volts via resistors 88, 90, and 92, each preferably 47K Ohm resistors, to collector portions of transistors 86, 96, and 100 respectively. The foregoing is only one example of detection and trigger circuit 52a, and it is noted that strictly Ir versions of detection and trigger circuit 52a may utilize and output approximately +12 volts DC.

Alternative coupling means for beam detector 76 and detection and trigger circuit 52a coupling may also be used. For example, sensor component 86 can be mechanically coupled directly to beam detector 76 without an beam coupler 82. In such an embodiment, beam diffuser 79 may still coupled to the front end of sensor component 86 to serve as a broad target for sensor beam 77. Thus, sensor beam 77 impacts beam diffuser 79 and the resulting diffused sensor beam 77 then impacts sensor component 86. The electrical power and signals from sensor component 86 are connected to the balance of detection and trigger circuit 62a. Those skilled in the art will recognize that other circuits, including microchips, may be utilized in appropriate circumstances for detection and trigger circuits.

Figure 3:
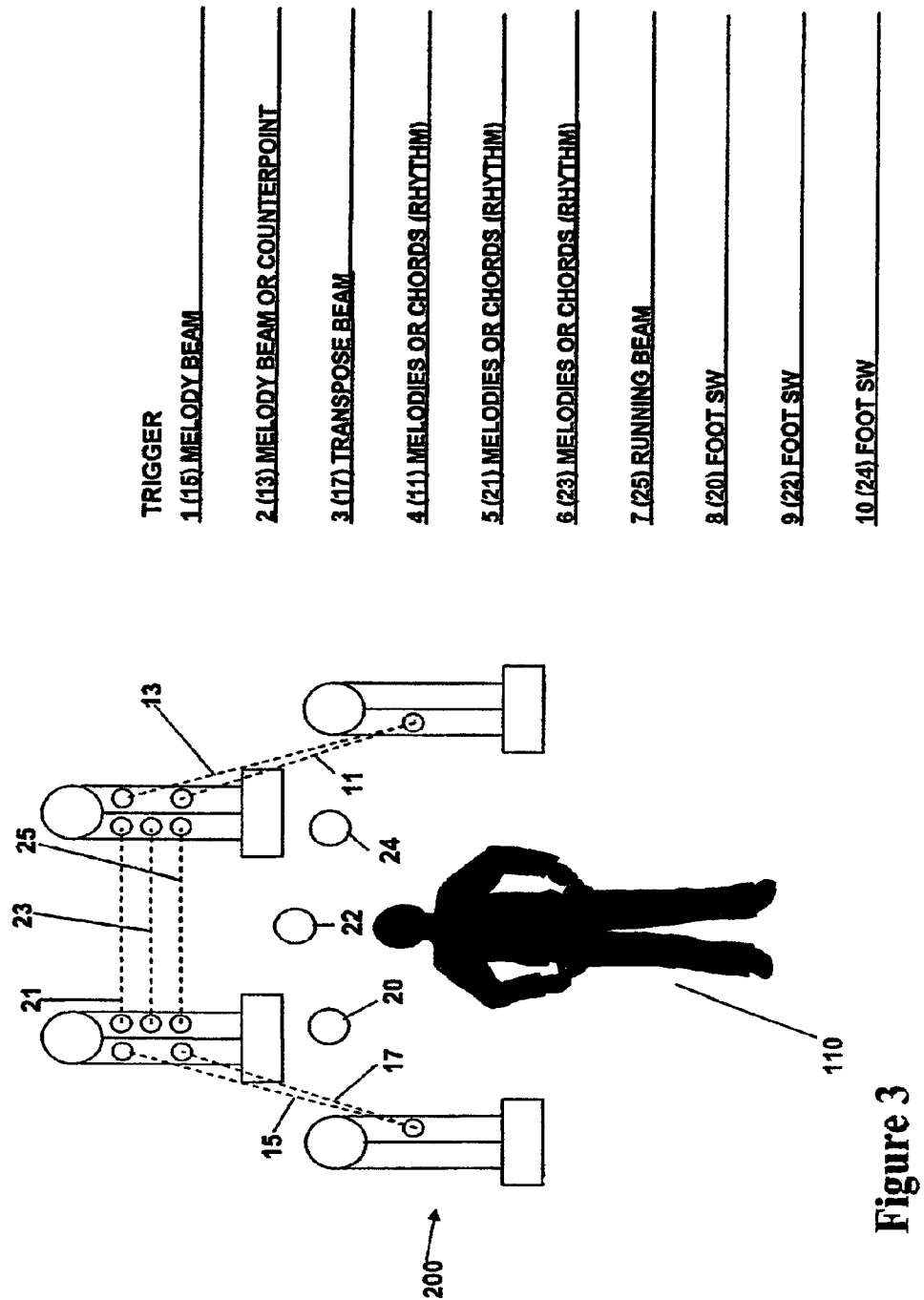
FIG. 3 is a functional block diagram illustrating a user and a preferred arrangement of a sensor array according to a preferred embodiment of the present invention.

FIG. 3 is a functional block diagram illustrating user 110 and a preferred sensor array arrangement according to a preferred embodiment of the present invention. A user 110 positions themselves within cage 200 formed by sensor beams 11, 13, 15, 17, 21, 23, and 25, and sensor posts 12, 14, 16, and 18; and foot switches 20, 22, and 24 are located within cage 200 as well. As previously described, the sensor beams and foot switches provide trigger inputs to controller 54.

A preferred designation of the trigger inputs is provided in Table 1:

TABLE 1

| Beam 1 | Sensor Beam 15 | Melody Beam |
| Beam 2 | Sensor Beam 13 | Melody or Counterpoint beam |
| Beam 3 | Sensor Beam 17 | Transpose |
| Beam 4 | Sensor Beam 11 | Melody or Rhythm Chords beam |
| Beam 5 | Sensor beam 21 | Melody or Rhythm Chords Beam |
| Beam 6 | Sensor beam 23 | Melody or Rhythm Chords Beam |
| Beam 7 | Sensor Beam 25 | Running Beam |
| Switch 8 | Foot Switch 20 | Program Change Increment |
| Switch 9 | Foot Switch 22 | Program Change Decrement |
| Switch 10 | Foot Switch 24 | Auxiliary |

Switches 20 and 22 are preferably coupled to controller 54 and enable switching and selection of a desired program from among those stored in controller 54. It should be noted that the number of programs available in controller 54 is limited only by the available memory of the controller 54, and additional programs may be added by connecting controller 54 to the Internet, or by adding plug-in cards or other enhancements to controller 54. It should also be noted that in an alternative embodiment, switches 20 and 22 may comprise a multiple switch unit such as the RFX Corporation MIDIBUDDY MIDI Controller.

Figure 6:
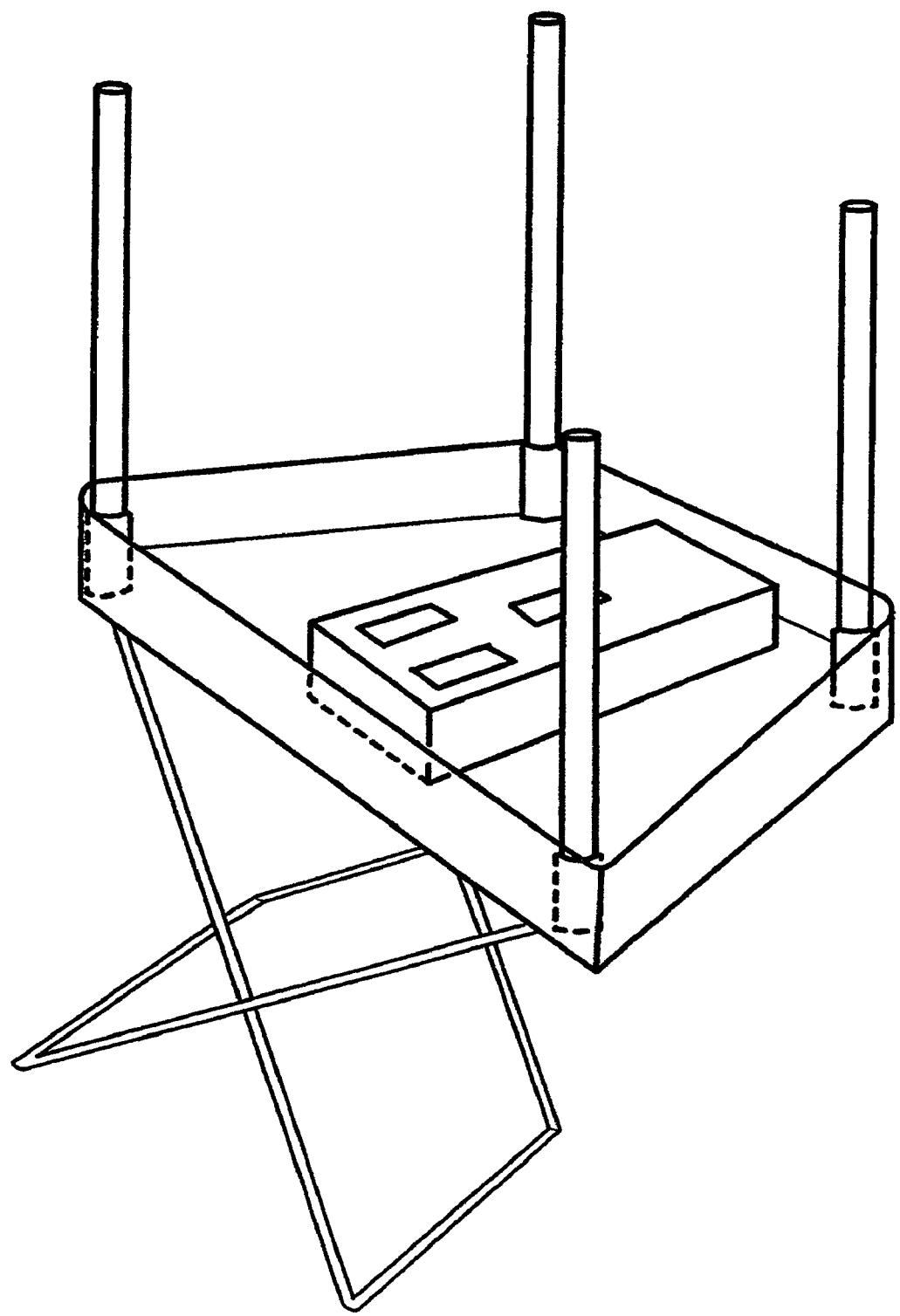
FIG. 6 is a perspective view of an alternate sensor post and sensor beam arrangement, designed for portable use, preferably comprising six sensor beams according to a preferred embodiment of the present invention.

FIG. 6 provides a perspective view of an alternate sensor post and sensor beam embodiment which is suitable for portable use. Such an embodiment preferably comprises six sensor beams (not illustrated), equipment for which is housed within sensor posts 12, 14, 16, and 18 in a manner similar to that which is described above for the larger, cage-type embodiment. The embodiment in FIG. 6 also preferably includes three touch switches 222, 224, and 226 which function in a manner similar to foot switches 20, 22, and 24 of the cage-type embodiment. Such touch switches may be positioned within a base unit 220 of the invention and actionable by hand, or such touch switches may be coupled to base unit 220 via a wireless or wired connection and actionable by foot, head, or other user body part. In addition to providing storage for sensor posts 12, 14, 16, and 18, and touch switches 222, 224, and 226, based unit 220 can also facilitate deploying the present invention upon a tabletop or a stand. Base unit 220 may be configured to hold sensor posts 12, 14, 16, and 18 at preferably a 45 degree relative angle. Such a preferred arrangement and angle is best illustrated in the photographs included in Appendix A. Additionally, base unit 220 may be constructed to accommodate a lid or other cover.

Figure 16:
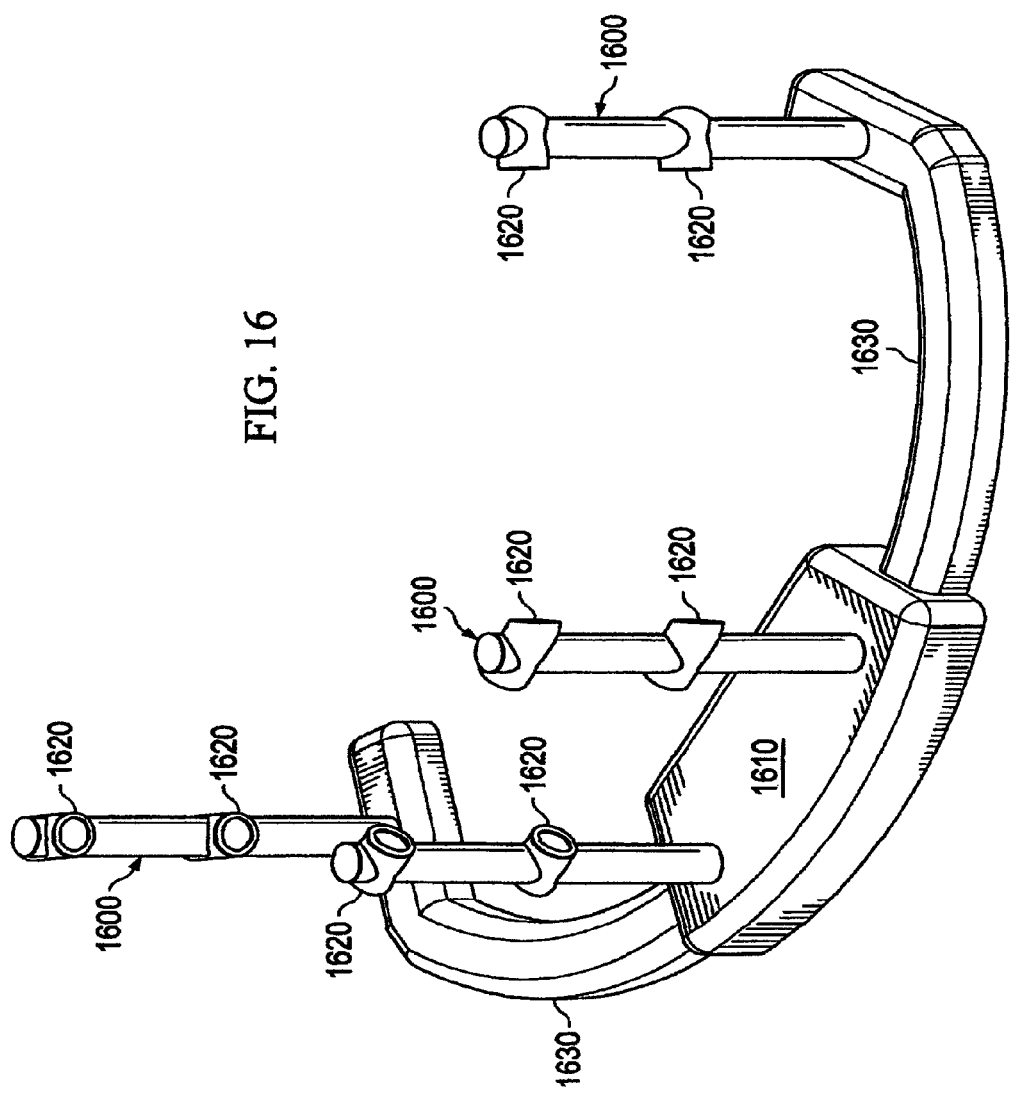
FIG. 16 is an alternative perspective view of the sensor post and sensor beam arrangement of FIG. 6.

FIG. 16 is an alternative perspective view of the sensor post and sensor beam arrangement of the portable embodiment of FIG. 6. As this figure illustrates, an alternative embodiment of a portable system according to the present invention allows Base 1610 to be expanded or contracted using Arms 1620. This allows the system to be easily packed up to improve portability.

In the portable embodiments illustrated in FIGS. 6 and 16, running beam 25 of FIG. 3 can be replaced with a running, or start-stop, touch switch. Such an embodiment is particularly adapted to playing in a relatively small space such as available upon a tabletop, or upon a portable stand such as for keyboards. The photographs supplied in Appendix A show still another alternate sensor post and sensor beam embodiment, preferably suitable for portable or table top use. This embodiment preferably comprises seven sensor beams and a foot switch module. The individual photographs are described below:

Appendix A, FIG. A is an overhead photograph looking down upon a portable sensor post embodiment, in which four vertical sensor posts and their accompanying seven beam emitters and receivers are visible.

Appendix A, FIG. B is a perspective photograph of a portable sensor post embodiment in which four vertical sensor posts and their accompanying seven beam emitters and receivers are visible. Also shown is a preferred positioning of the portable sensor post assembly upon a keyboard stand.

Appendix A, FIG. C is an elevational photograph showing a DrumKAT, a QSR synthesizer, and a MIDIBUDDY controller installed into a permanent installation.

Appendix A, FIG. D is an elevational photograph showing a alternate stand-alone sensor post assembly for tabletop use in combination with wall mounted sensor elements. The beam receivers are shown glowing with the received laser light.

Appendix A, FIG. E is a perspective photograph of a portable sensor post assembly, in which four vertical sensor posts and their accompanying seven beam emitters and receivers are visible. Also shown is the positioning of a portable sensor post assembly upon a keyboard stand.

Appendix A, FIG. F is an overhead photograph looking down upon the portable sensor post assembly, in which four vertical sensor posts and their accompanying seven beam emitters and receivers are visible.

Appendix A, FIG. G is a perspective photograph of a portable sensor post assembly, in which four vertical sensor posts and their accompanying seven beam emitters and receivers are visible. Also shown is the positioning of a portable sensor post assembly upon a keyboard stand.

Appendix A, FIG. H is an elevational close-up photograph of an alternative stand-alone sensor post assembly for tabletop use which shows more closely a laser emitter coupled toward the top of a sensor post.

Appendix A, FIG. I is an elevational close-up photograph showing a breakout box assembly for coupling sensor elements to a DrumKAT.

Appendix A, FIG. J is an elevational close-up photograph showing a portion of the portable sensor post assembly upon a keyboard stand with one beam emitter and two beam receivers more clearly defined.

Appendix A, FIG. K is an elevational close-up photograph showing a portion of the portable sensor post assembly upon a keyboard stand with three beam emitters more clearly defined.

Appendix A, FIG. L is an elevational close-up photograph showing a breakout box assembly coupling the sensor elements to the DrumKAT.

Appendix A, FIG. M is a perspective photograph of the portable sensor post assembly, in which four vertical sensor posts and their accompanying seven beam emitters and receivers are visible placed upon a keyboard stand. Also shown is a musician playing the portable sensor post assembly embodiment of the present invention.

Figure 7:
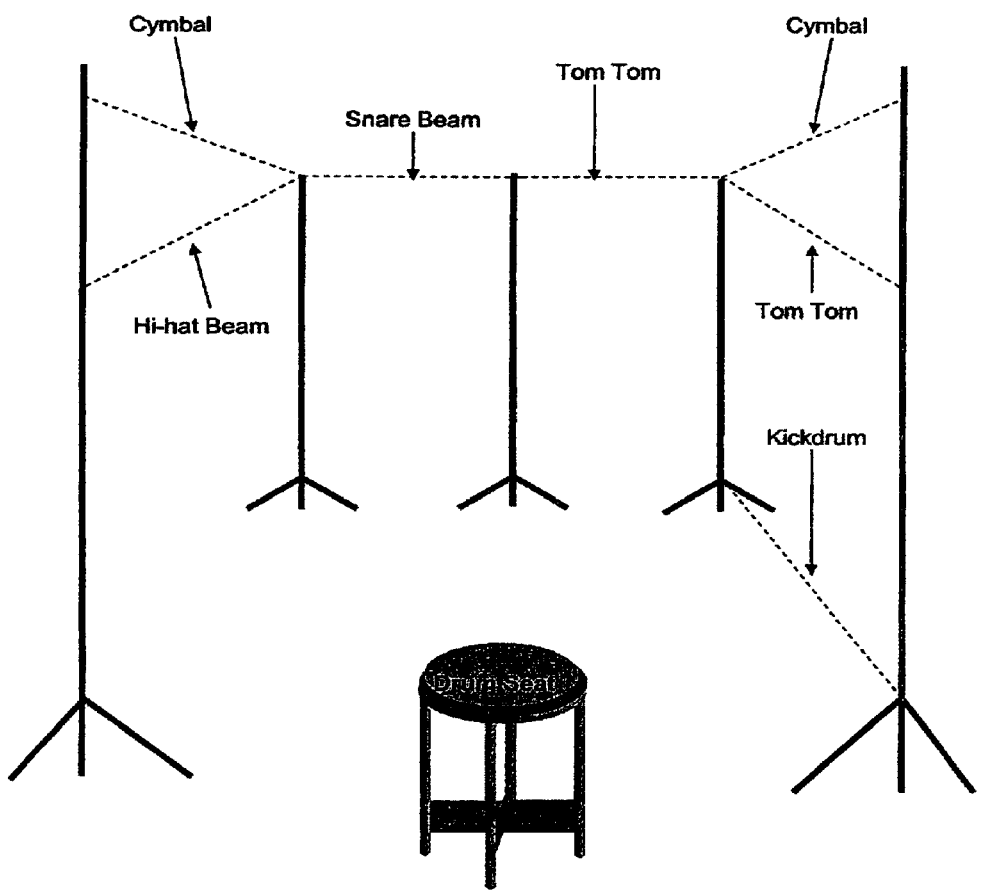
FIG. 7 provides a perspective view of another alternate sensor post and sensor beam arrangement preferably comprising seven sensor beams adapted and arranged to be utilized in a fashion similar to a drum set according to a preferred embodiment of the present invention.

FIG. 7 is a functional block diagram of an alternative sensor post and sensor beam arrangement, preferably comprising seven sensor beams 710 through 716, which has been adapted and arranged to serve as a drum set according to a preferred embodiment of the present invention. This alternate embodiment highlights the advantages of using thin sensor beams, as this allows the sensor beams to be interrupted using small diameter instruments, such as drumsticks. Thus, a user sitting upon a seat 700 can "play the drums" by interrupting sensor beams 710 through 716 for various types of drum, such as a tom-tom, snare drum, or the like. Additionally, a sensor beam placed at foot level enables such things as kick drums. While the description and illustration in FIG. 7 refer to specific drum sounds on specific sensor beams, it should be apparent to one skilled in the art that such sounds may be mapped to alternative sensor beams, or that other sounds can be mapped to the sensor beams without departing from the spirit and scope of the invention.

FIGS. 8 through 13 illustrate alternative embodiments of the present invention. FIG. 8 provides side and perspective elevational views of an alternate sensor post and sensor beam arrangement preferably comprising seven sensor beams. The embodiment illustrated in FIG. 8 is similar to that of FIG. 1 except that the sensor beams on the sides run parallel to their own reflectors, rather than to a single reflector per side as illustrated in FIG. 1.

FIG. 9 illustrates an alternative sensor post and sensor beam arrangement preferably comprising eight sensor beams. Although similar to FIG. 8 on the sides, the front of this embodiment comprises four beams rather than three and the beams feature crossover points in which a plurality of sensor beams pass through a single spot. This feature allows a user to play chords by interrupting two sensor beams at the same time with a single hand, drumstick stroke, or the like.

FIG. 10 illustrates an alternative sensor post and sensor beam arrangement preferably comprising nine sensor beams according to a preferred embodiment of the present invention. The alternative embodiment of FIG. 10 is similar to that of FIG. 8, except that nine sensor beams are provided, thereby enabling more complex compositions and combinations.

FIG. 11 illustrates an alternative sensor post and sensor beam arrangement, preferably comprising six sensor beams according to a preferred embodiment of the present invention is shown. The alternative embodiment of FIG. 11 is similar to that of FIG. 8, except that six sensor beams are utilized, which may make it easier for a novice user to comprehend and use the invention.

Figure 12:
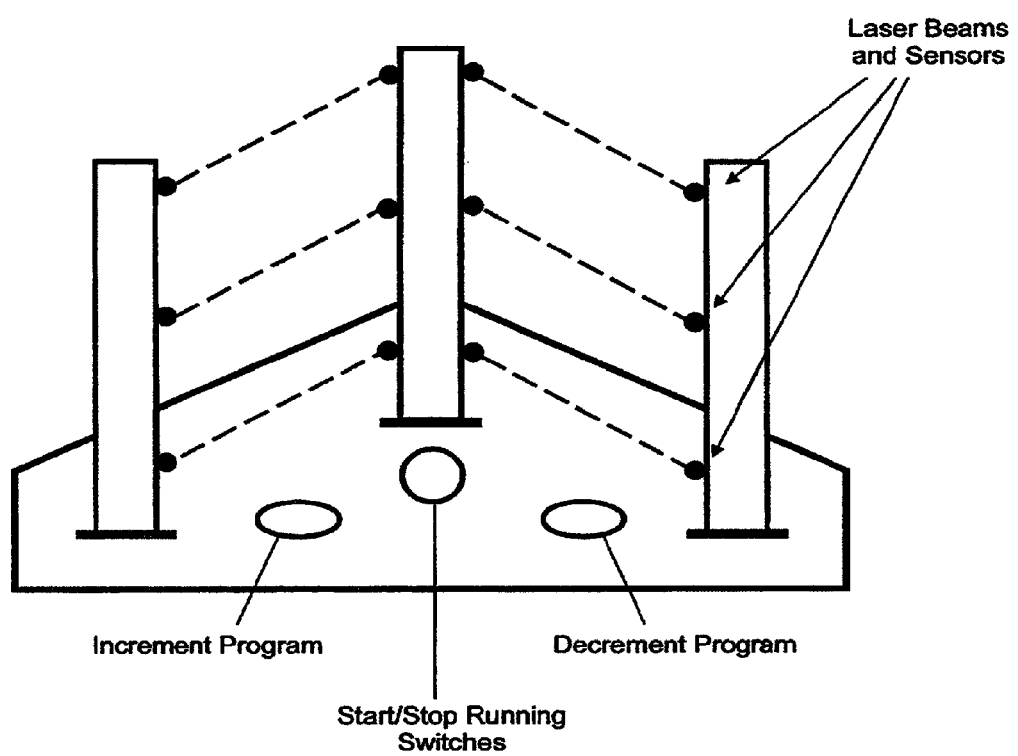
FIG. 12 is a perspective view of another alternate sensor post and sensor beam arrangement preferably comprising six sensor beams according to a preferred embodiment of the present invention.

FIG. 12 illustrates a functional block diagram still another alternative sensor post and sensor beam arrangement utilizing only six sensor beams in combination with three foot switches. In this embodiment, the three foot switches allow a user to increment and decrement the selected program, and to start/stop running loops, thereby replacing the running beam of FIG. 8.

Figure 13:
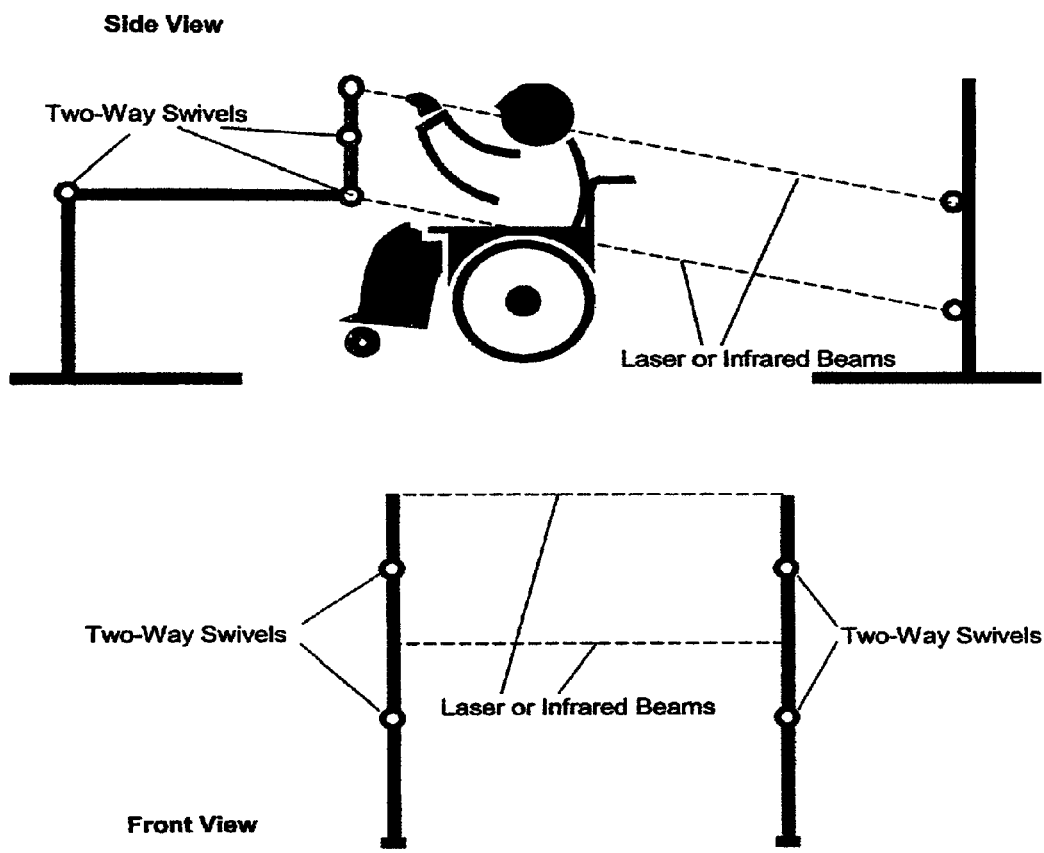
FIG. 13 provides front and side elevational views of an alternate sensor post and sensor beam arrangement, for physical therapy, or wheelchair accessible use, preferably comprising six sensor beams adapted and arranged to accommodate a user in a wheelchair, according to a preferred embodiment of the present invention.

FIG. 13 illustrates an alternative sensor post and sensor beam arrangement which may be useful for physical therapy or use by disabled persons in a wheelchair. The embodiment illustrated in FIG. 13 preferably utilizes swiveling posts and arrangements that support transpose beam elements such that the beam elements can be positioned to accommodate the use of the system by a person in a wheelchair or by a person undergoing physical therapy.

Figure 14:
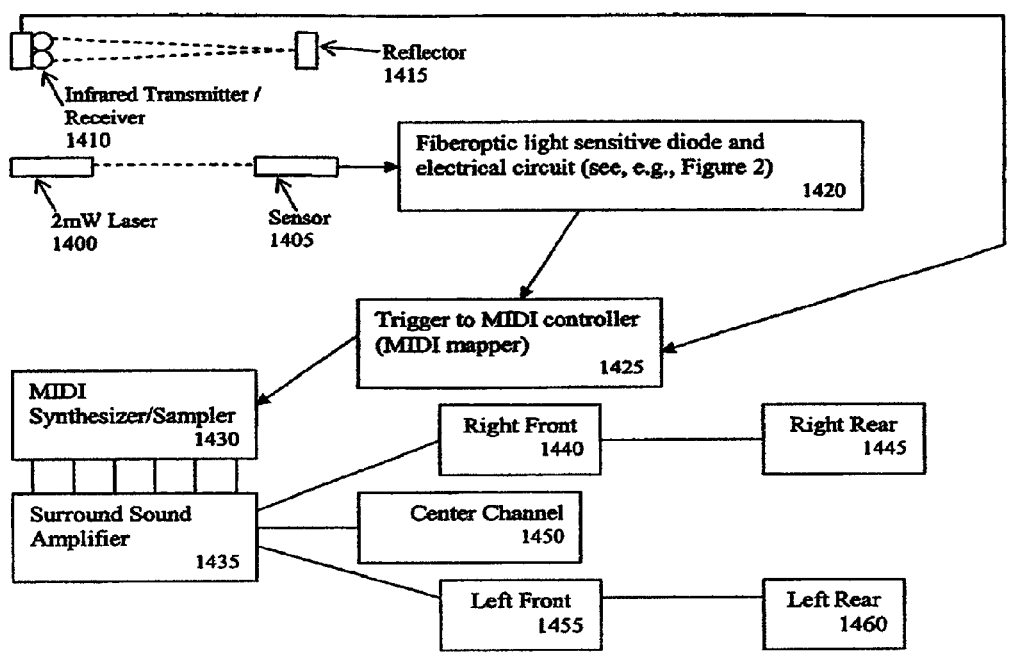
FIG. 14 is a block diagram of a preferred motion sensing and trigger circuit system showing both infrared and laser trigger inputs according to a preferred embodiment of the present invention.

FIG. 14 is a block diagram of a preferred motion sensing and trigger circuit system showing both infrared and laser trigger inputs according to a preferred embodiment of the present invention.

This figure illustrates a preferred control signal flow in a hardware based embodiment, from Infrared Transmitter/Receiver 1410 through Speakers 1440-1460.

Figure 15:
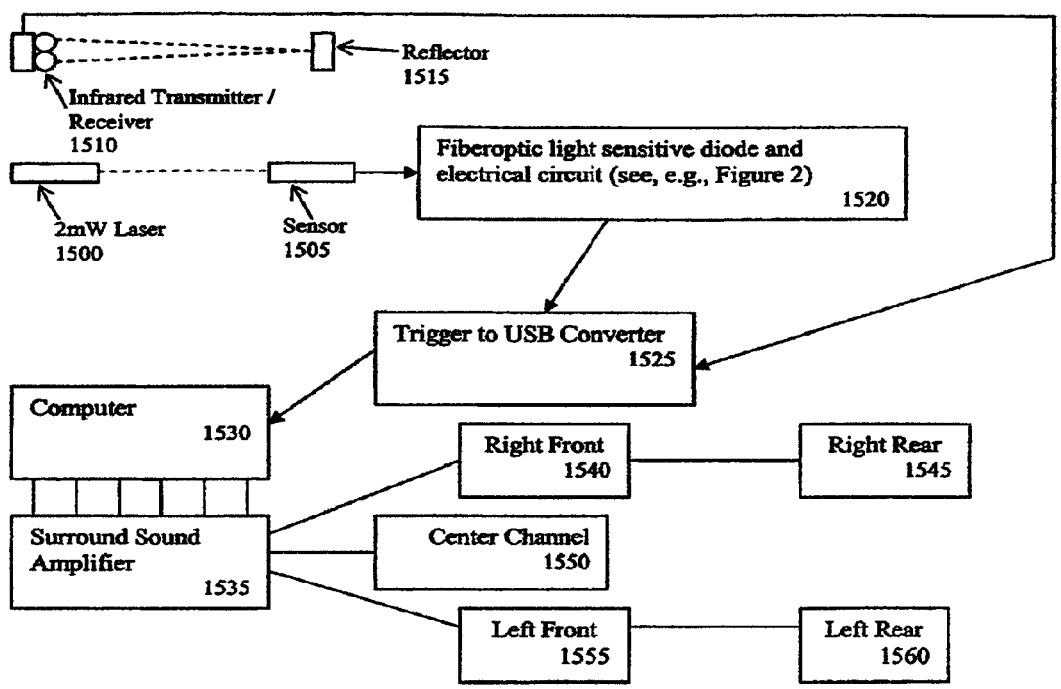
FIG. 15 is a block diagram of a preferred motion sensing and trigger circuit system showing both infrared and laser trigger inputs according to an alternative embodiment of the present invention.

FIG. 15 is a block diagram of a preferred motion sensing and trigger circuit system showing both infrared and laser trigger inputs according to an alternative embodiment of the present invention. This figure illustrates a preferred control signal flow in a software based embodiment, from Infrared Transmitter/Receiver 1410 through Speakers 1440-1460.

Although the descriptions above discuss specific numbers of sensor beams and specific sensor beam arrangements, it should be apparent to one skilled in the art that the number and arrangement of sensor beams can be varied without departing from the spirit or the scope of the invention.

Hardware Operation Description

With reference to FIGS. 1 and 3 the system 10 functions as follows. It should be noted that although the following discussion is made with reference to FIGS. 1 and 3, the features, principles, and other aspects of the present invention are also applicable to alternate embodiments, including those discussed herein. Synthesizer/sequencer 56 is pre-programmed with a selected program or programs. Each program comprises one or more tracks, or channels, of sound data. Such sound data, as previously explained, comprises musical data, nature sound data, special sound effects data, or the like. By way of example, without intending to limit the present invention, such sound data may include musical compositions upon one or more musical instruments produced electronically, water noises, wind noises, animal noises, or artificial "electronic" sounds. Thus, channel one might comprise a particular sequence of notes or chords designating a violin as the particular sound, or "voice", to be output when the program is played. In turn, channel two might comprise the same sequence of notes or chords but instead designating a flute as the particular sound to be output when the program is played. It is noted that as used by those skilled in the art, a program typically refers to a stored configuration of parameters which emulates the sound of an instrument or sound effect, such as a piano, synthesizer, or drum set. Although the present application makes specific reference to the use of an Alesis QSR and programs therefor as synthesizer/sequencer 56, those skilled in the art should recognize that such programs may not be limited to operating only on the Alesis QSR, but as appropriate, may be utilized upon many different synthesizers, sequencer, or appropriately equipped personal computers or workstations. In addition, it should be obvious to one skilled in the art that the programs described herein may be easily modified so as to operate on alternative synthesizers, thus permitting such alternative synthesizers to be used in place of an Alesis QSR.

As supported by current generation Alesis QSR synthesizers, a Mix may comprise a combination of one to sixteen individual programs. These Mixes can be used in many ways. The most common usage is to produce multi-timbral sounds, especially when connected to a MIDI sequencer. Multi-timbral sounds means that for each of the sixteen possible channels supported in a hardware-based synthesizer/sequencer 66 (a sensor beam triggers one or more MIDI channels in embodiments of the present invention) a different program may be selected, thus creating anything from a small pop/rock ensemble to a complete orchestra. Another way of using a mix is to layer two or more programs together so that they play simultaneously from a MIDI controller. An instrument can also be program split, for example by assigning one program to the lower half of a keyboard while another program is assigned to the top half. Programs can even overlap in the middle in such embodiments. Further information on programs, Mixes, and splits is available in commercially available references, such as the QSR Reference Manual, published by Alesis of Los Angeles, Calif., and the drumKAT Turbo Guide, published by Alternate Mode, Inc. of Chicopee, Mass., the teachings of which are incorporated herein in their entirety.

Additionally, it should be noted that a traditional synthesizer/sequencer 56 plays one or more Programs in synchronization once a pre-programmed Program is started. Thus, be it one or sixteen tracks, once started all selected tracks or channels will play in synchronization, or at the same clock speed (also known as dwell time). Thus, although the individual tracks or channels may not play together, the timing intervals are the same. However, in the software embodiment in development discussed below, the clock speed of the different tracks or channels is adjustable on an individual channel basis.

FIG. 3 illustrates a preferred, full body embodiment of the present invention. In the embodiment illustrated in FIG. 3, user 110 positions themselves within "cage" 200, which is formed by the sensor beams 11, 13, 15, 17, 21, 23, and 25, and the sensor posts. As previously described, each sensor beam represents a trigger input to controller 54. In addition, foot switches 20, 22 and 24 also provide trigger inputs to controller 54. A preferred designation of the trigger inputs for the embodiment of FIG. 3 is provided in Table 2.

TABLE 2

| Trigger Input | Input Name | Trigger Function |
| --- | --- | --- |
| Beam 1 | Sensor Beam 15 | Melody Beam |
| Beam 2 | Sensor Beam 13 | Melody or Counterpoint beam |
| Beam 3 | Sensor Beam 17 | Transpose |
| Beam 4 | Sensor Beam 11 | Melody or Rhythm Chords Beam |
| Beam 5 | Sensor Beam 21 | Melody or Rhythm Chords Beam |
| Beam 6 | Sensor Beam 23 | Melody or Rhythm Chords Beam |
| Beam 7 | Sensor Beam 25 | Running Beam |
| Switch 8 | Foot Switch 20 | Program Change Increment |
| Switch 9 | Foot Switch 22 | Program Change Increment |
| Switch 10 | Foot Switch 24 | Auxiliary |

In the embodiment illustrated in FIG. 3, beams one and two, identified as sensor beams 13 and 15, are melody beams which are preferably "synchronized" to each other. These two sensor beams preferably include detailed melodies in their sound data. Those skilled in the art will recognize that under appropriate circumstances other sound data may be programmed onto sensor beams 13 and 15. It is noted that a key feature of embodiments of the present invention is that the sound data, preferably the musical melodies, coupled to each of the separate sensor beams are sympathetic to each other. Thus, the sound data assigned to those sensor beams have been specifically chosen to be in harmony to each other such that a pleasing combination will always result. Such sympathetic musical melodies have characteristics that will be elaborated upon further below.

In the preferred embodiment of FIG. 3, beam seven, identified as sensor beam 25, is the running beam. The running beam preferably provides the function of starting an underlying rhythm section or loop. The running beam may be thought of as providing a function of establishing the mood, the musical scale, and the root note of the piece (so the melody beams don't feel rootless). In the case of other sound data it may start a bed of jungle noises, birds, etc. The running beam functions in that once sensor beam 25 is interrupted, the sound data coupled to the running beam starts playing continuously by virtue of controller 54 preferably having the channel assigned to the running beam sensor beam selected to an Autoplay mode. When the running beam is subsequently interrupted, the sound data coupled to the running beam stops playing. Additional examples of running beam programs would be an orchestra punch with tympani and low sustaining contra bass, a guitar strum with strings; or in the case of a program that uses environment sounds or animal sound samples a loop of jungle background sounds or ocean waves.

Beams four, five and six, identified as sensor beams 11, 21, and 23 are melody beams. These three sensor beams preferably comprise detailed melodies as their sound data, wherein such melodies are in sympathy with those upon Beams one and two. Those skilled in the art will recognize that under appropriate circumstances other sound data may be programmed onto sensor beams 11, 21, and 23. Additionally, as previously described, such sound data may also preferably comprise nature sound data, special sound effects data, etc. e.g.—water noises, wind noises, animal noises, artificial "electronic" sounds, etc. that is in sympathy with sensor beams 13 and 15.

Beam three, identified as sensor beam 17, is known as the transpose beam. The transpose beam transposes each assigned sensor beam 11, 13, 15, 21 or 23 to a new key, chord, or sound. Such transposition changes the "color" of the sound data being output by system 10. Each time sensor beam 17 is interrupted all sensor beams designated in a transpose matrix are instantly transposed to a new key, chord, sound, or combination thereof. By way of example, without intending to limit the present invention, a transpose value can be added to a real-time offset, and each note that is transpose enabled is offset by this amount. Preferably, the number of transpose steps or values is unlimited, although the Alesis QSR is currently limited to a maximum of 8 transpose values. A software based embodiment may not face such limitations.

Sensor beams 11, 13, 15, 21 and 23 each represents a "building block" to a composition played upon system 10. A user builds their composition in real time depending on when and for how long they interact with one of these blocks of music by interrupting sensor beams 11, 13, 15, 21 or 23, and further by when, where, and how the user transposes sensor beams 11, 13, 15, 21 and 23 at any given moment. All of the music elements of the building blocks coupled to sensor beams 11, 13, 15, 21 and 23 are preferably "harmonious" or "sympathetic" with each other and can be arranged in any order. Thus, a user will be able to perform increasingly complex concerts of sound data as they become more and more familiar with the programmed contents of sensor beams 11, 13, 15, 21 and 23. The various building blocks programmed and coupled to each applicable sensor beam preferably relate to the tempo of the running beam. By way of example, some sensor beam building blocks can be set very fast for trills, fills, and the like, while others match or are slower than the tempo of the running beam.

An example of a preferred Program playback setup (utilizing seven sensor beams as shown in FIGS. 1 and 3) is as follows:
STEP 1: Assign or select a particular Program of building blocks for the running beam (Beam 7), sensor beam 25.
STEP 2: Assign or select a particular Program of building blocks for Beam 1, sensor beam 15, preferably comprising 1 to 128 notes or building blocks in length.

STEP 3: Assign or select a particular Program of building blocks for Beam 2, sensor beam 13, preferably comprising up to 128 notes or building blocks in length.

STEP 4: Assign or select a particular transpose effect or mode to the transpose beam, Beam 3, sensor beam 17. Note that a note or sound effect may be added to the transpose beam that is played when the transpose beam is interrupted, usually the root note in music, and a transpose matrix is also programmed. Note that all beams in the matrix preferably transpose simultaneously, including the transpose beam if desired.

STEP 5: Assign or select particular Programs of building blocks for Beams 4, 5, and 6, sensor beams 11, 21, and 23. Such musical building blocks are preferably comprised of alternate chords that fit against the predominant scale (relative minors, suspended chords, etc.). It should be noted that sensor beams may also be linked so a melody in 3-part harmony could be written on a single sensor beam.

As previously discussed, each of the sensor beams may now be "played" or "performed". In other words, the sensor beams can create control, or trigger, signal(s) 51 of FIG. 1. Such "playing" can be done using objects of varying size, such as, but not limited to, thin sticks or wands, drumsticks, one or more fingers, a hand, a foot, a leg, or a head, to interrupt one or more of sensor beams 11, 13, 15, 21 and 23. Each of sensor beams 11, 13, 15, 21 and 23 is "synchronized" such that if a user passes their hand through a sensor beam once, they trigger exactly one note, or sound data event. However, if the user holds their hand in the path of a sensor beam continuously, the notes, or sound data events, will play for as long as the sensor beam is blocked.

In a hardware-based embodiment, continuous sound data playback is made possible by "overdriving" controller 54 input with sensor beam trigger signal(s) 51. Controller 54 is input with approximately 12 volts DC which results in a continuous triggering of the program on that channel of controller 54. Note that this feature may be particular to the DrumKAT system, in that overdriving controller 54 inputs in a manner other than specified in a controller's specifications or manual can result in the continuous triggering or playing of the sound data events. These features thus enable control, or playing, of embodiments of the present invention in a manner affording more precise control than systems in the prior art.

By way of example, without intending to limit the present invention, in the embodiment illustrated in FIGS. 1 and 3, system 10 preferably implements the above "synchronized" functions as follows: As desired and selected during programming of the synthesizer/sequencer 56, each sensor beam trigger signal(s) 51 received by the MIDI controller results in one or both of the following responses: The synthesizer/sequencer 56 "plays" pre-programmed MIDI notes in selected playback modes (see below), or it changes the note-value transpose offset, which is applied to qualifying MIDI notes as they are being sent to synthesizer/sequencer 56 via the MIDI Output port of controller 54.

It should be noted that although the following refers to "MIDI notes" the explanation applies also to other building block events or notes.

Playback modes for pre-programmed MIDI note(s):

a. Single Note:
One MIDI note is played for each trigger signal(s) 51.

b. Multiple (Single Step) Notes:
Between one and four MIDI notes are played with programmed delay and duration for each trigger signal(s) 51.

c. Alternating Single-Step Loops of MIDI Notes.
Each trigger signal(s) 51 plays the next successive MIDI note in a specific pattern.

d. Programmed Motifs (MIDI Note Sequences).
Each trigger signal(s) 51 starts or stops playback of MIDI Motifs in a fashion that is similar to a MIDI sequencer. Motifs are played with a specified tempo and are played once or looped.

e. Continuous Playback.
Interruption of one beam causes a prolonged trigger signal, which causes a single note, if one is assigned to the trigger, to be played for an extended duration, or, if multiple notes are assigned to the trigger, the multiple notes are played in synchronization and sequentially until the beam is no longer interrupted.

Thus, a user may "play" system 10 by moving their fingers, or by other means as previously discussed, so as to interrupt one or more sensor beams 11, 13, 15, 21 and 23.

An additional feature of the embodiment illustrated in FIGS. 1 and 3 concerns foot switches 20 and 22. Foot switches 20 and 22 are coupled to synthesizer/sequencer 56 and may be used to increment or decrement the program to be played by system 10. Thus, as desired, the user may change from, for example, a musical program to a jungle or electronic music program responsive to interruptions of the sensor beams 11, 13, 15, 21 and 23.

It should be noted that embodiments of the present invention have features that enable their installation and use in many and diverse situations. By way of example, without intending to limit the present invention, some suggested applications comprise:

Professional Musicians—In one embodiment, various drum sounds can be assigned to individual beams, and the system can be played like a drum set. In another embodiment, the present invention can be configured with a plurality of running beams, such that activation of one or more beams produces rhythmic, harmonious music without requiring a performer to constantly interact with the present invention. By way of example, without intending to limit the present invention, such an embodiment may be of interest to dance club disc jockeys ("DJ's") or the like. Home entertainment center—The music room of the future. "Edu-tainment" centers for children (such as Planet Kids)—Kids tend to eventually break or wear out things, such as the piano keys made for jumping around on, but embodiments of the present invention are unbreakable and last forever. Performance Theater of all kinds, from experimental musicals to Hip-Hop or Rock bands. Embodiments of the present invention have the potential to become a staple with hip-hop bands or dance-oriented acts. Fashion Show runways Ballet—the music coming from the movements of the dancers themselves. Or skaters, as in the Ice Capades The Folk instrument of the future—anyone can make impressive music immediately. Physical therapy—the simplicity of the design makes it ideal for handicapped children or adults to have a fulfilling musical experience, regardless of age or level of intellect. The beams are so precise that when positioned properly, they can be adjusted for even the tiniest range of movement—even using a fingertip, a wand held between the teeth, or a breath controller. Museum Exhibits—active participation, or an array of beams across the entrance. It is the very definition of "interactive." Toys—anyone, but especially children, can be encouraged to learn using the present invention. A simplified embodiment of the present invention, without the above-described foot switches, may be desirable in such applications. Further, the individual beams can be labeled, such as with numbers, letters, or symbols, to facilitate learning. By way of example, without intending to limit the present invention, one or more farm animal sounds may be assigned to each beam, and a corresponding picture of an animal can be placed next to the beam.

When a child interrupts a beam, the present invention can cause the sound typically associated with the animal depicted next to the beam to be played, thus encouraging children to recognize the names and sounds of various animals. In another example, the present invention can be configured to teach the alphabet by playing back recordings of other children singing letters of the alphabet each time a beam is interrupted or continuously if a beam is interrupted for an extended period of time. In still another example, the present invention can be configured to teach a user to count by playing back recordings of one or more persons saying a numbers, in incrementing and/or decrementing order, each time a beam is interrupted or continuously if a beam is interrupted for an extended period of time.

Music System Description

The "sympathetic" musical system of the present invention, according to a preferred embodiment thereof, will now be described. Each beam of the music instrument can represent a "building block" to a composition. A composition is built in real time based on the style and duration of a performer's interaction with one or more of these blocks of music (as by interrupting a beam), and when and where the performer transposes the beams at any given moment. All building blocks are harmonious with each other and can be arranged in any order. The more a performer learns about what is programmed on a particular beam the more control the performer has over the musical "scene".

According to a preferred seven beam embodiment, such as that illustrated in FIGS. 1 and 3, beam #7—sensor beam 25—is preferably designated as the "running" beam. This beam, when interrupted, acts as an "on/off" switch to start and stop background music to the musical "scene". This background music, or running beam program, typically anchors the scene and is intended to run throughout. Examples of typical running beam programs include, but are not limited to a rhythm loop (like a backup band); an orchestra punch with tympani and low sustaining contra bass; a guitar strum with strings; and a loop of jungle background sounds or ocean waves.

The running beam, sensor beam 25, is normally addressed first by the user. It establishes the mood, the musical scale, and the root note of the piece (so the melody beams don't feel rootless). Beam #3, sensor beam 17 is preferably the transpose beam. Each time it is interrupted, all beams designated in the transpose matrix are instantly transposed to a new key, chord, sound, or combination thereof. All other beams are preferably programmed with melodies or effects, in various tempos that relate to the tempo of the running beam. Some are set very fast for trills and fills or the like. They are all preferably "synchronized melody" type beams, meaning that if a user passes his or her hand through the beam once, one note is triggered; a user who holds his or her hand in the beam will cause the melody to be played for as long as the beam is blocked, with the played melody in synchronization with the other sounds played by the invention.

The composition scheme is typically to go from one beam to another, or from one building block to another, rather than playing many at the same time. To get two or several notes to play at the same time in an harmonious way, a program writer may place such synchronous notes directly under the control of a melody beam, or the performer may interrupt two or more melody beams at the same time. A typical performance can include, but is not limited to, a performer playing a few notes on one beam, then switching to another beam, then throwing in an accent on still another beam. This is opposed to the prior art way of writing a composition that is locked into an exact harmony scheme or that can only be played one way. According to the present invention, a performer can spend a little time on one beam, a little on another, and see a composition begin to take shape. Depending on the player, the composition can be different every time.

Applicant has developed, using the western 12-tone equal tempered scale supported by the Alesis QSR, programs that work in the following modes or styles: Jazz, classical, new age, calypso, hip hop, R & B (Rhythm and Blues), country, rock, dance, swing, flamenco, film score, arcade-style sound effects, environments (such as, but not limited to, ocean, rain forest, rain storm, and animal sounds) and modern synthesizer patches that are impossible to categorize. Sample programs are provided in U.S. Provisional Patent Application No. 60/312,843, filed Aug. 16, 2001, entitled "Music Instrument System and Method".

While the Alesis QSR is presently a preferred synthesizer/sequencer 56, the present invention can easily be adapted to support scales other than western by using a synthesizer that allows user scales, such as the Korg M1. With the Korg M1, the musical scheme "composer" could program scales for intervals for Chinese music, or ¼ tones, or any other type of interval.

In writing a program, when a note is input into the controller, typically from a keyboard or sequencer, the channel address comes with it, as do volume and velocity. When a program writer changes to a new program, the controller typically sends out a program change telling the synthesizer which program is to be addressed. The controller can use a single synthesizer or be hooked up to a chain of synthesizers, as desired or necessary, for a particular application.

It is presently preferable that the "sympathetic" scales and chords used by a program writer will be selected from the following example kinds of scales (i.e., including transpositions of such scales/chords):

Abbreviated C MAJOR SCALE (no B note used)—C D E F G A-C—The chords used as counterpoint will preferably be—C-Csus-Dm-Dm7-Am-Am7-F-Fma-j7-G-G7— (also—C bass- F bass- and G bass work well against all of these scales).

C MODAL SCALE (pentatonic with Bb added) (has no 3rd)—C D F GA Bb-C—This type of scale is darker than major and not as dark as minor. The chords used as counterpoint will preferably be Dm-Dm7-Bb-F-Fsus-G7 (no 3rd is "bluesy")—C7 (no 3rd is "bluesy")—Csus-Gm-Gm7—. Modified C Natural MINOR SCALE (no Ab used)—C D Eb F G Bb-C—The chords used as counterpoint will preferably be—Cm-Cm7-Bb-Bbsus-Gm-Gm7-F7 (no 3rd is "bluesy")—Eb-Ebmaj7-Dm-G7 (no 3rd is "bluesy"). Modified C Harmonic MINOR SCALE (B changed to Bb)—C D Eb F G Ab Bb-C—The chords used as counterpoint will preferably be—Cm-Cm9-Bb-Bb7-Ab-Abmaj7-Fm-Fm7-Gm-Gm7-G-F7 (no 3rd is "bluesy"). C Minor Blues Scale (no 2nd)—C-Eb-F-G-Bb-C—It's a minor blues scale when played against a C bass but is a major scale (with a 6th) when played against an Eb bass. An F7th chord (with no 3rd) or an F9 chord works well against it.

As used above, the term "chord" is intended to mean a block chord or a group of melody notes assigned to a beam that, when played, will outline the chord. The idea is to use, at essentially all times, only the 5 or 6 or 7 notes which, when sounded together in pairs or more will not sound disharmonious.

It is noted, as applicant has found, that the above example sets of notes (and their transpositions) fall into highly preferred restricted classes. Put simply, counting each half-step in a usual 12-half-step scale, the spaces between the preferred notes of a set would be, as below modified, either a 2-3-2-2-3 spacing or a 3-2-2-3-2 spacing (where the asterisk (*) shows the highly-preferred bass note location):

For the *2 3 2 2 3 spacing, either the first "3" space will become a "2-1" pair of spaces or the second "3" space will become a "1-2" pair of spaces with the bass note in the sets being the note just before the "2" space as shown.

For the *3 *2 2 3 2 spacing, either neither "3" will change or the first "3" will become a "2-1" pair of spaces or the first "3" will become a "2-1" pair of spaces and the second "3" will become a "1-2" pair spaces with the base note in the sets being as shown above and in the corresponding example scales above.

The note sets discussed above, and all their transpositions as a set, comprise the highly preferred sets of notes from which a program writer, according to this invention, will preferably choose essentially all of the notes to be played during a selected time period. These sets of notes each represent a "sympathetic" scale and note-set, in that the sounding of more than one of the notes in a set together will not be heard by an ordinary audience as disharmonious.

Example of the Development of a Seven Beam Sound "Scene"

Preferred Example of the Development of a Seven Beam Sound "Scene"

STEP 1—Develop a loop, riff, strum, or other underpinning for the "running" beam (preferably Beam 7—sensor beam 26). This decides the key, scale, and the mode for all the other beams.
STEP 2—Write a melody, preferably on Beam 1 (sensor beam 15) which is 1 to 128 notes long, using a scale that fits "sympathetically" with the notes and scale of the running beam.
STEP 3—Write a melody or counterpoint, preferably on Beam 2 (sensor beam 13) and again up to 128 notes long, that is harmonious to the melody on Beam 1 (e.g., using same "sympathetic" scale). Beams 1, 2, 3, and 4 preferably never (but always only briefly and seldom) have notes on them that will "clash" with the running beam (i.e., notes not found on the then-being-used "sympathetic" scale). This allows the inexperienced player to "walk around" in these beams/notes without the possibility of a "clashing" note.
STEP 4—Assign the "transpose beam", preferably to Beam 3 (sensor beam 17). A note or sound effect is then preferably added to Beam 3 (usually the root note) and a transpose matrix is preferably also programmed on it. When a performer breaks this beam, all beams in the transpose matrix transpose simultaneously (including Beam 3, if desired).
STEP 5—Write melodies and/or chords on Beams 4, 5, and 6 (sensor beams 11, 21, and 23) using alternate chords that fit against the predominant scale (relative minors, suspended chords, and the like). Beams can also be linked so that, for example, a melody in 3-part harmony could be written on a beam. Each melody is preferably programmed with up to 128 notes written on it and any or all using complimentary but different synthesizer sounds (such as different "instruments" playing in different octaves, etc.). Although the melodies are preferably complementary, no other restrictions are placed on the melodies, such that the melodies can, for example, move in different directions, such as one ascending and one descending, or play with one an octave higher than the other.

Thus, a program writer can create building blocks to an endless variety of possible real-time compositions to be composed/played by a performer.

Other Preferences

It is noted that if a performer breaks a melody beam on the beat, a note will preferably play on the beat. If a performer breaks a melody beam one or more times between beats, a single note will be "syncopated" into the melody. While this configuration is preferable for amateur musicians, the present invention can be made to include an option that allows users to turn off such forced syncopation should they wish more control over the system.

It is also noted that, although the tempo settings assigned to the synchronized melody beams are currently global, they will preferably be independently settable. As a tempo example, a performer may set beam #1 to a 12/4 (3 notes per quarter note as relates to the "running beam"), Beam #2 to an 8/4, Beam #3 (one shot) as the transpose beam, Beam #4 is also set as a one-shot, and Beams #5 and #6 can be made synchronized melody beams but set extremely fast (for trills-drum fills etc.). Beam #7 is the "running beam" (also a one-shot), so that means in this example we really only deal with the tempo relationships between the running beam and Beams #1 and #2. For example, if the running beam is set at 100 BPM and Beam #1 is set at 12 beats per bar and Beam #2 at 8 beats per bar, then if a running beam is used at the tempo of 133 BPM, then Beam #1 will play 8th notes against it and Beam #2 will play ¼ note triplets. And if a running beam tempo of 67 is used, then Beam #1 will be playing 16th notes and Beam #2 will play ⅛th note triplets. This global tempo setting is currently a limiting characteristic of the Alesis QSR controller and will be corrected to give any beam complete tempo control with development of the software system herein described.

As also stated elsewhere herein, the present invention includes software and hardware that implements preferred trigger-to-MIDI capabilities. Trigger-to-MIDI functions, as well as synthesizer sounds, samples, loops, etc., are reducible to software or digital sound representations, and such reduction can allow the present invention's capabilities to increase immeasurably, costs to drop dramatically, and ease of programming to increase. Such software will preferably be upgradeable by E-mail, dial-up connection, Internet download, or other wireless or wired means. Further, a "Band in a Box" type program is preferably included with the present invention to generate melodies, with such a program preferably programmable by a person with simple computer skills and little musical knowledge. By including an artificial intelligence music program like "Band in a Box" (a current popular program for writing original music on a home computer), a user is able to generate unlimited melodies just by signifying a root note and choosing a chord structure. When a user finds a melody that is to their liking, they can then insert that melody into the sequence of notes assigned to a particular beam. There are many programs of this type currently on the market which allow music writers to write music very quickly, including backing tracks for songs, and the programs can generate a considerable assortment of melodies, modes, and styles of backing tracks. These backing tracks and/or loops can also be programmed onto the "running beam" of the system of this invention as easily as a simple melody.

A professional user will undoubtedly make more use of his/her own melodies and effects and may do this in an endless number of ways. By way of example, without intending to limit the present invention, a professional user might program two beams to be used specifically in the verse of a piece, two others to be effective in the bridge, and two for another section—and all of them could contain program change information so that the 2nd time around they use completely different sounds or effects. Any melody, rhythm, sequence, loop, harmony, or sample can be programmed on a beam so the musical possibilities are truly endless.

An alternate embodiment of the trigger-to-MIDI software further comprises hardware to interface trigger circuitry into a personal computer or workstation, preferably using the Universal Serial Bus interface. This embodiment also includes hardware and software for outputting sound signals into an appropriate sound amplification and playback system, such as a Dolby Digital sound card within the computer. The interface trigger circuitry is currently implemented via a "breakout box". Such a breakout box preferably allows the coupling of the control, or trigger, signal(s) 51 (see FIGS. 1-2) into the breakout box and then into the personal computer. The breakout box can also be configured to allow audio signals 57 to be readily accessible to external speakers, amplifiers, and the like. Thus, as previously described, such software and hardware will provide the features of sound data generator system 50, including programmability features associated with detection and trigger circuits 52.

Hardware/Software Comments

According to an embodiment of the present invention, a hardware-based configuration comprises an Alternate Mode DrumKAT MIDI controller and an Alesis QSR sound module. In the most basic terms, the function of the DrumKAT controller is to translate trigger pulses from the various beams into MIDI events which are sent to the Alesis QSR via a MIDI Output port. When the Alesis QSR receives MIDI notes from the controller, it either plays the note against one of its internal synthesizer voices or it plays a custom-made audio sample from a Flash-RAM card.

A goal of a software-based embodiment is to replace the above-stated hardware functions, and other related functions, with an integrated software system, preferably for a Windows™ platform. While a Windows platform is presently preferred, it should be apparent to one skilled in the art that alternative operating system and related computer hardware architectures platforms can be substituted therefor, such as, but not limited to, Mac OSX, produced by Apple, Inc. of Cupertino, Calif.; Linux, originally produced by Linus Torvalds of the University of Helsinki in Findland and now available from a variety of software developers; and Lindows, produced by Lindows.com, Inc. of San Diego, Calif., without departing from the spirit or the scope of the invention. Listed below are brief descriptions of some of the functions which are preferably supported in a software-based embodiment. This list is intended for illustrative purposes only and should not be interpreted as limiting the present invention to these functions.

A software-based embodiment of the present invention should include positive features of the hardware-based embodiment, including the following:

Depending on programming, each Beam trigger pulse received by the software results in one or more of the following responses:
It "plays" pre-programmed notes or sounds in selected playback modes (see below);
It changes the note-value transpose offset, which is applied to qualifying notes as they are being sent to the sound generation system; or It changes the sound scene upon which the notes are based, for example switching from a gospel-like sound to a Caribbean-like sound, or from a gospel-like sound to a jungle theme, complete with animal sounds mapped to some of the melody beams.

Playback modes for pre-programmed note(s) include:
Single Note—The same single note is played for each trigger pulse.
Multiple (single step) Notes—Between one and four notes are played with programmed delay and duration for each trigger pulse.
Alternating single-step loops of MIDI notes—Each trigger pulse plays the next successive note in a specific pattern.
Programmed Motifs (MIDI note sequences)—Each trigger pulse starts or stops playback of MIDI Motifs in a fashion that is similar to a MIDI sequencer. Motifs are played with a specified tempo and are played once or looped.
Continuous Synchronous Notes—A continuous trigger pulse allows multiple notes to be played, with each note preferably played in synchronization with the background tempo.

Changing the current Transpose value (Note Offset) includes:
Each pulse adds the next specified transpose value to the real-time offset or selects the next transpose map from a list of available transpose mappings.
During playback, all notes that are transpose enabled are offset by a specified amount if a single transpose value is specified, or
During playback, all notes that are transpose enabled are offset according to their respective values within the transpose map.

Functions/features of a preferred synthesizer/sequencer include:
It should have a large library of quality musical voices, as well as its own programmable effects;
It should have at least 4 audio outputs, which can be used for quadraphonic, Dolby® surround sound, or other audio imaging;
It should play custom samples from optional Flash-RAM cards or other removable media; and,
It should support sample playback and imaging to allow for environments-based programs.

Comparing Hardware to Software

By comparing the preferred MIDI sequencing functions outlined above with those available with current music software such as Cakewalk Sonar, produced by Twelve Tone Systems, Inc. of Boston, Mass., it is apparent that such functions can be replaced or replicated with current Windows DirectX™ plug-in software. The types of plug-ins needed in such software include synthesizers, sound modules, samplers, DSP effects processing, and Dolby 5.1 Surround Sound encoding. All of these plug-ins are currently available in a variety of versions.

There is now no direct software replacement for the Alternate Mode MIDI controller. However, almost all of the necessary MIDI controller functions are represented in some form within music software such as Cakewalk Sonar™ software. The MIDI playback functions of the Alternate Mode MIDI controller involve the playing back of one or more pre-defined MIDI note sequences. A selection of playback modes govern the manner in which the sequence is played.

The playback mode is determined at the time the sequence is created. Playback is started and stopped by a trigger pulse from a designated Beam. A trigger pulse from another designated Beam can further govern the playback by adjusting the value of the MIDI Note Transpose Offset. In summary, the current controller gives each Beam the option of playing a selected sequence, and/or it can change the transpose value in real-time.

With a few differences, MIDI software, such as, but not limited to, Cakewalk Sonar, provides the same basic playback capabilities of the Alternate Mode controller. Instead of the Beams providing real-time user input, Cakewalk Sonar uses the Mouse, Keyboard, other input devices, or combinations thereof, to start and/or stop sequence playback and to adjust the value of a real-time MIDI Note Offset. Normally, Cakewalk Sonar sequences are played in sequential mode or they are continuously looped at predefined points. Although Cakewalk Sonar can record sequences in a single-step mode, it currently lacks the ability to play them back that way. Hence, the alternating single-step playback mode provided by the current MIDI controller cannot be achieved by Cakewalk Sonar without some additions/modifications. While a software embodiment offers advantages over a hardware-based embodiment, such a limitation can make a hardware-based embodiment more desirable in some situations.

Cakewalk Sonar and other music software also cannot currently provide the ability to limit the number of notes that will be actively played at a given time. Some existing plug-in synthesizers can regulate note polyphony within their own programming, however it would be preferable to have this feature as part of the MIDI playback engine. It is noted that as presently implemented in a hardware embodiment, controller 54, which is presently preferably a DrumKAT MIDI controller running the TURBO DrumKAT operating system version 4.5 or greater, allows for a maximum of four note polyphony. Future embodiments will want a much greater polyphony feature.

To provide for all of the current requirements of the system of the present invention, a software-based embodiment should include a shell that has the ability to run specific music software modules of the types in current use. For example, a stripped-down version of the Cakewalk Sonar playback engine can be used to play pre-sequenced MIDI data according to proprietary run-time parameters according to the present invention. These user-supplied parameters are typically created and maintained by a software shell and stored as a "patch" on the hard disk. For example, pre-sequenced MIDI data can be created and maintained for each Beam as a normal Cakewalk Sonar (.WRK) file. A direct link to Cakewalk Sonar itself can provide this capability. Further information and features are explained in detail in the soft cover manual Sonar Power! By Scott R. Garrigus published in July 2001 by Muska & Lipman Publishing; ISBN: 192968536X.

In addition to using Cakewalk Sonar, the present invention can also take advantage of DirectMusic Producer, an Application Programmer Interface for Windows based computers published by Microsoft Corporation of Redmond, Wash. An embodiment including DirectMusic Producer is described later herein.

Transpositions

With the Alternate Modes MIDI controller, any beam can be set, or linked to a beam that is set, to the option of "Control Mode". In control mode the option of "Transpose" includes eight stages of transpose. Each step can be programmed up or down 0 to 50 half steps, then reset to the first level and started over again. Which of the beams is caused to transpose is decided on another page of the controller by assigning it a "Y" or an "N" in the transpose grid. Other options in control mode include:

program change (single or group);
tempo change;
alt reverse (reverses the order of the melody notes); and
Motif mode (Motifs are the running sequences triggered with a running beam).

A preferred embodiment of the present invention uses control mode for transposes and motif playback, although other uses should be apparent to one skilled in the art.

By way of example, without intending to limit the present invention, a transpose beam can be put in control mode and linked to a trigger that sends one or more notes when it's interrupted (the idea being that, if a performer is breaking that beam to transpose everything, it might be preferable as well to issue such notes). Sometimes a program-writer may use an effect, such as castanets on a flamenco program, but most of the time it is preferred to use a note or group of notes such as a strum.

This brings up the problem of what notes to use, as these notes will preferably be the first notes of the transposed key that follows. Another problem that arises is whether to transpose the "transpose" beam along with all of the rest. Different schemes may be preferred depending on the mode or sound of the program, and the present invention supports all of these various options. Several examples of how such options can be treated by the present invention are detailed below.

In the first two examples the transpose beam is transposed along with the others. If the program is in a major mode or a mode with no 3rd in it, it is often preferred to use the root on the transpose beam. Then when the transpose beam is struck, the root (e.g., C) sounds but every note after it will be in the new key. So a "friendly sounding" transpose scheme might be from C up +5 steps (these are half steps) to F (the C note will sound fine against the F chords), then +5 more to Bb (causing an F against Bb), then +5 to Eb (Bb against Eb)+2 to F (Eb against F), then down −10 (½ steps) to G (F against G), and then it resets to beginning (with G against C). In a minor mode, it is often preferred to use the 5th on the transpose beam with this scheme. If in C minor, the transpose scheme preferred may be to go up +7 steps to Gm (G against Gm), down −5 steps to Dm (D against Dm), up +7 to Am (A against Am), down −5 to Em (E against Em), up +4 to G♯ (B against G♯), down −3 to Fm (Eb against Fm), down −5 to C (C against Cm) and reset over, etc.

In a third example, a user or program-writer prefers not to transpose the transpose beam along with the others, and a seven or eight note sequence is linked to the transpose beam such that each time the transpose beam is hit, all other beams are transposed and the note on the transpose beam itself has exactly the effect on the following chord that a program-writer prefers. This method works especially well with scales that leave out the 3rd as a program-writer may make subsequent notes feel major, minor, suspended, etc. A fourth example transpose beam scheme is to link two triggers to the transpose beam and make a seven or eight note sequence in parallel 5ths. This is a preferred alternative against a scale with no thirds.

It should also be noted that it is possible to transpose to a separate range on the synthesizer itself, for example 2 octaves up, where there may have been installed an entirely different set of sounds for that range, thereby changing the color or colors of the program entirely, at least until a subsequent transposition brings it back down. In such a transposition scheme, the program is using the same notes, but now they may be played by violins instead of flugelhorns, and in any desired key as it is also possible to program the synthesizer in a way that it plays chosen intervals (for example, in 5ths).

Any one or all of the above effects and transpose schemes can be accomplished by controlling which notes are transposed and how the synthesizer's receive channels are programmed. There is an interesting, albeit limited, amount of control available to a program-writer over these attributes, but it involves programming the controller and the synthesizer to accomplish all of them. A preferred software-based embodiment of the present invention makes it simple to do this and much more. In such an embodiment a program-writer can simply choose a root note and chord type, etc., from a menu. Such a software system can create a better controller than the Alternate Modes DrumKAT, for example, with the ability to link as many notes or sequences as desired, to add loops onto the end of other loops, to transpose by chord signature instead of just moving the same note stream up or down in increments, and other such functions. Most importantly, by implementing the controller as a software-based system, the features and functions of the controller can be easily upgraded as the world changes or as a performer's or program-writer's needs change.

Ways to Play Music Instrument

A performer would usually prefer to play the instant music instrument in the following manners, as relates to playing the above-described seven beam instrument with reference to the beam numbers and descriptions detailed elsewhere herein.

Normally, the running beam is triggered first to turn the motif sound on, but at times a performer may elect to "introduce" the running-beam motif with, for example, some single notes or strums played by multiple triggers of selected melody beams. A performer will usually wish to "test" all the beams for a while to get familiar with the arrangements of notes and effects on the various beams. For this purpose a "shortcut" might be to hold one's hand in each melody beam steadily (thus playing continuous notes) until the performer knows what kinds of notes and/or effects are contained in a beam. In this manner, a performer may identify, for the program selected, which beam or beams are running beams, which are melody beams and which are transpose beams, etc. If all or a set of available programs have a particular pattern of using the same beam for a running beam and transpose beam, it will help a performer.

Even a novice performer can quickly learn to start the running beam early, keep it running, and avoid the transpose beam until/unless desired. Usually, a performer will obtain favorable results by "triggering" melody beams quickly rather than blocking such beams for multiple-note effects. Often, one or more melody beams will then play single notes at the will of the performer; and one or more other melody beams may play trills or runs of a few notes each when triggered a single time. The performer, by determining the timing of the interruption of various melody beams, will quickly be able to play the kind of composition desired (e.g., fast notes, slow notes, syncopation, rhythms, etc.).

The performer has many other options to modify/enliven the creation of the real-time composition. For example, the performer may choose to break two or more beams at a time to create a harmony of notes; or the performer may choose to transpose regularly (by breaking the transpose beam) to enjoy different sets of notes, octaves, instrument effects, etc., depending upon the transposition schemes made available by a program-writer.

In terms of body performance, the music instrument of the present invention permits each performer to use as much or as little body movement to interrupt various beams as desired by the performer. For example, the performer may wish to use only slight movements of not much more than each forefinger to interrupt transpose beams. Or the performer may use exaggerated movements of body, arms, and legs in the interruption of beams. Thus not only is the real-time composition a unique expression of the performer, but so is also the style of presentation of the performer.

Even multiple performers playing on the same instrument at the same time, such as two children, will provide, for each program, unique real-time performances. The music instrument system of the present invention may also be equipped with abilities to record real-time performances to capture them for playback. Since the quality of the performances will tend to vary, sometimes unpredictably, it is preferred to have a "re-looping" type of recording so that, when a performer or observer senses that a "savable" performance has been going on, the preceding set number of minutes of music played, beams triggered/interrupted and the timing related thereto, or other events, may be saved to a more permanent memory device.

For playing of fast runs or trills, even when these have not been set up to be played by interrupting a beam once, the performer may, by quickly moving spread fingers through a single-note-at-a-time melody beam, create a pleasing run/trill. It has been found that an interesting program-writer technique may be captured for this instrument by writing, say, a succession of upwardly moving notes on a melody beam and also using those same notes, but in reverse order, on another beam to produce a pleasing succession of downwardly moving notes. In that way, a performer is set up by the program-writer to manufacture a pleasing "run" using spread fingers.

Presently Preferred Hardware Environment
Overview

Presently, a preferred hardware-based system configuration consists of an Alternate Mode DrumKAT (DrumKAT) MIDI controller and an Alesis QSR (QSR) MIDI sound module. In the most basic terms, a DrumKAT MIDI controller translates trigger pulses from the beams themselves into MIDI events which are sent to a QSR MIDI sound module. When a QSR MIDI sound module receives a MIDI note from a DrumKAT MIDI controller, the QSR MIDI sound module can either play the note against one of its internal synthesizer voices or play the note from a limited number of custom-made audio samples from an external Flash-RAM card.

In their standard form, current DrumKAT MIDI controllers only provide most of the preferred requirements of the present invention. To accommodate all of these requirements, modifications to the DrumKAT MIDI controller's processor chip or operating system is necessary. Current QSR MIDI sound modules provide all of the preferred requirements of the present invention, although its sample playback capabilities are both complex and extremely limited.

Presently Preferred Software Environment Overview

The goal of a software-based embodiment is to provide the functions of a DrumKAT MIDI controller and a QSR MIDI sound module in an integrated software system, preferably developed for the Microsoft Windows platform. This goal is currently being realized by utilizing features provided by Microsoft's DirectMusic Application Programmer's Interface (API), a sub-set of Microsoft's Direct-X API set. Incorporated herein by reference in their entirety are printouts describing DirectMusic and the functions available therefrom, which have been obtained from www.msdn.microsoft- .com. Additional information about Microsoft's DirectX API, Microsoft's DirectMusic API, and the related Direct Music Producer can be found on the World Wide Web at www.msdn.microsoft.com. The primary purpose of the DirectMusic architecture is to provide real-time control of programmed audio content for interactive games and other multimedia software applications. Microsoft's DirectMusic Producer software provides a development system for designing and producing DirectMusic content. Currently, all DirectMusic content is preferably played (processed) by a Windows based execution shell that serves as the primary user interface.

Real-time playback control of the DirectMusic content in a software-based embodiment of the present invention is accomplished by a custom designed execution shell that serves as an interactive interface between each beam or trigger and the DirectMusic content that has been developed for that beam. Interactive input control of this shell program is preferably provided by a proprietary Universal Serial Bus (USB) interface to the beam pulse circuitry. Information on USB, including technical specifications, can be found on the World Wide Web at www.USB.org.

Most of the software requirements can be accomplished using standard functions within DirectMusic Producer itself. Those functions which are not directly supported by DirectMusic and DirectMusic Producer can be implemented through script programming capabilities within DirectMusic Producer. Where appropriate, certain functions can also be programmed into the custom designed execution shell.

In Table 3, functions are identified with these designations:

DKAT Std—Function is provided by Drum KAT controller without modifications.

DKAT Modified—DrumKAT controller software can be modified to provide the function, Dmus Std—Function is provided by DirectMusic Producer standard function set.

Dmus+ Script—Function can be programmed using DirectMusic Producer audio scripting capability.

Function can be programmed into the custom designed execution shell.

TABLE 3

| HumanBeams Requirements | Current Hardware DKAT Std | Phase II Software DKAT Modified | Dmus Sdt | Dmus+ Script | Custom Shell |
|---|---|---|---|---|---|
| Beam Interface Properties: | | | | | |
| Bounce repeat (programmable by individual<$1 td> Delay before bounce | — | — | | | X |
| Bounce repeat pulse rate (optionally synchronized with tempo) | — | — | | | X |
| All Inclusive Track Contents: | | | | | |
| All Standard MIDI events | | X | X | | |
| All standard Audio & Multimedia Playback<$1 td> Multiple Track Playback Synchronization: | | | | | |
| Individual tracks can playback independently from each other | X | | X | | |
| Real-time (Triggered) Track Play back Controls: | | | | | |
| Stepped Track Playback[1] | $X^3$ | | | X | |
| Sequenced Track Start/Stop Playback[2] | $X^3$ | | X | X | |
| Real-time (Triggered) Melodic Playback Controls: | | | | | |
| MIDI Note Transpose (Numeric Offset) | $X^3$ | — | X | X | |
| Key/Chord Transpose (Quantize) | — | — | X | X | |
| Programmable Polyphony: | | | | | |
| Programmable polyphony (per track) | $X^5$ | | | | X |
| Future Expansion Options: | | | | | |
| Programmable control and synchronization of lighting effects | — | — | * | * | * |
| Provide the ability to network multiple users | — | — | * | * | * |

Note
[1]Each trigger pulse incrementally plays the next defined region of a track.
Note
[2]Each pulse starts/stops playback of a track in a fashion that is similar to a midi sequencer. Tracks are sequentially played once, or looped a specified number of times.
Note
[3]Available with limitations.
Note
[4]Midi notes trigger custom audio samples from a Flash-RAM card within the sound module.
Note
[5]DKat choices are 1, 2, 4.
* These capabilities exist within the Microsoft DirectX architecture.

Unlike some previously described software-based embodiments, a software-based embodiment utilizing DirectMusic Producer can allow for more versatility than a hardware-based embodiment, and may therefore be more desirable in some applications. By way of example, without intending to limit the present invention, a software-based embodiment can allow entirely new sounds to be associated with one or more beams based on a single user command, in addition to simple sound transpositions. Thus, for example, a software-based embodiment can allow a performer to switch from a set of sounds, or sound scene, designed to play music to a sound scene for playing nature sounds simply by breaking a transpose beam, breaking the transpose beam or another beam for an extended period of time, pressing a foot switch, or the like. In addition, a software-based embodiment typically allows more sounds to be played simultaneously and can operate on more simultaneous trigger signals, as many as one hundred in a preferred embodiment, compared to the sixteen channels supported by traditional MIDI.

Figure 17:
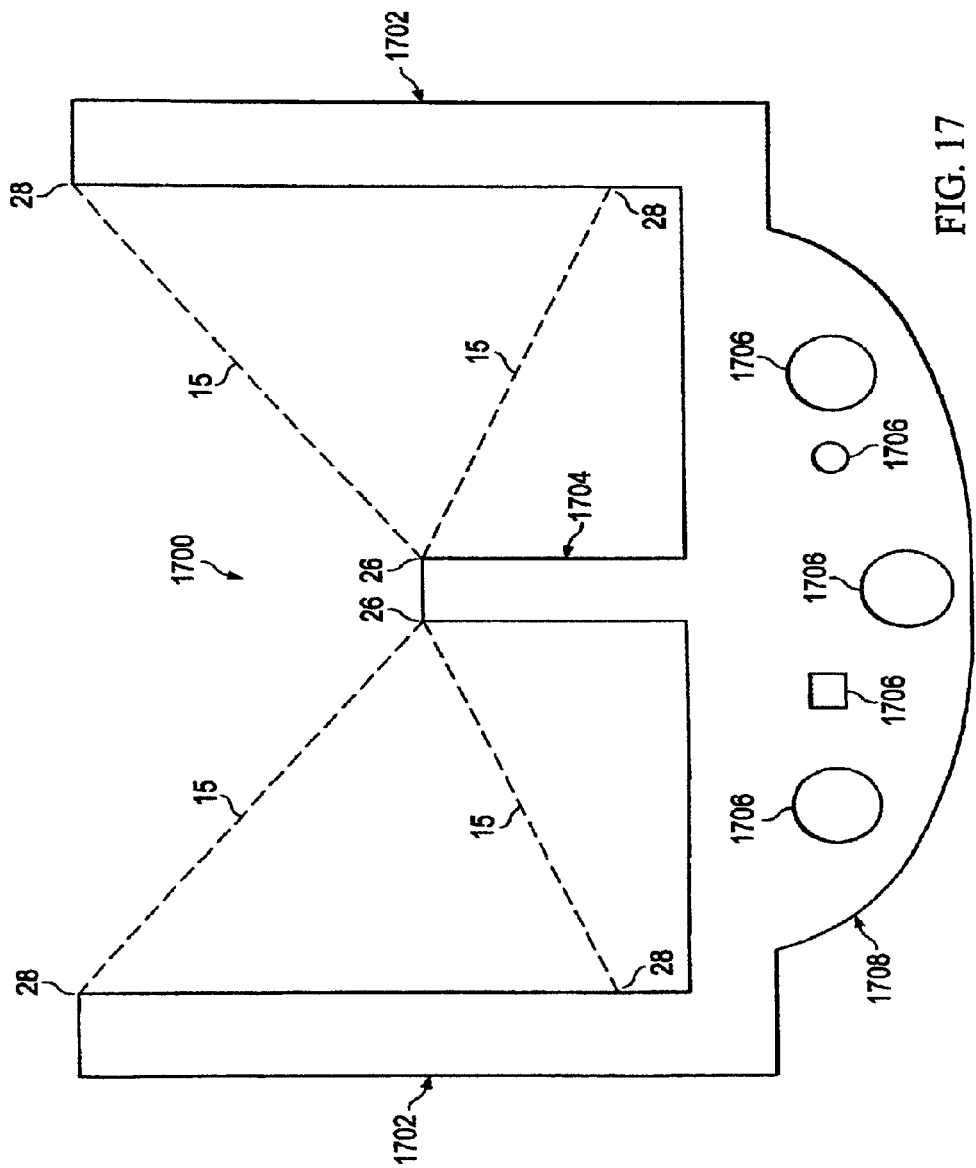
FIG. 17 depicts a controller configured to generate a plurality of electromagnetic beams that may be interrupted by a user, such as to control an element of visual display, such as a character or object in up to 3-dimensions, such as a gaming device.

Referring now to FIG. 17, there is shown another preferred embodiment of the present invention at 1700 seen to comprise a media controller having a plurality of emitters 26 and receivers 28 generating beams 15 which may be selectively interruptible by a user to generate control signals configured to control the visual rendition/display and/or manipulation of a visual object on a display. As shown, the controller 1700 has a housing forming generally "W" shape including a pair of opposing longer handle members 1702 disposed each side of a center member 1704 having a shorter length, each of the members 1702 and 1704 extending generally parallel to one another and extending upwardly from a base portion 1706. The electromagnetic beams 15 emitted by the respective transmitters 26 are directed towards a corresponding receiver 28, as shown, with four such electromagnetic beams 15 being shown in this embodiment, although no limitation to this member is to be inferred. Also shown is a plurality of manual switches 1706 which may reside across the base member 1708, which switches may be operable simultaneously or independently with the operation of beams 15, advantageously, each of members 1702, which may form handles, may be grasped by the palm of the user 15 respective hand while the fingers/digits of the user may selectively interrupt the transmission of the proximate beam 15 between the respective transmitter 26 and receiver 28, as shown.

Each beam 15 may be correlated to a particular function or characteristic of the image(s) generated on a display, such as display 1714 shown in FIG. 19 and which will be discussed shortly. For instance, the upper left beam 15 and the upper right beam 15 may control a left and right control, respectively, of the object image, such as object 1900 and/or 1902 in FIG. 19. Also by way of example, the lower left beam 15 and the lower right beam 15 may be configured to control the orientation of the objects 1900 and 1902 orientation in the upward and downward direction, respectively. The different attributes of the visual objects 1900 and 1902 may be configured to be controlled upon the selective interruption of the respective beam 15 as desired. One or more of the beams 15 may be configured to be correlated with or independent of another visual object that may be associated with visual objects 1900 and 1902, such as ammunition 1904 and 1906 being generated and/or controlled with respect to the image 1902. Similarly, one or more of the beams 15 may be configured to control the speed, direction, size, or some other parameter of a visually rendered image as desired by a user controlling the image shown in FIG. 19.

Figure 19:
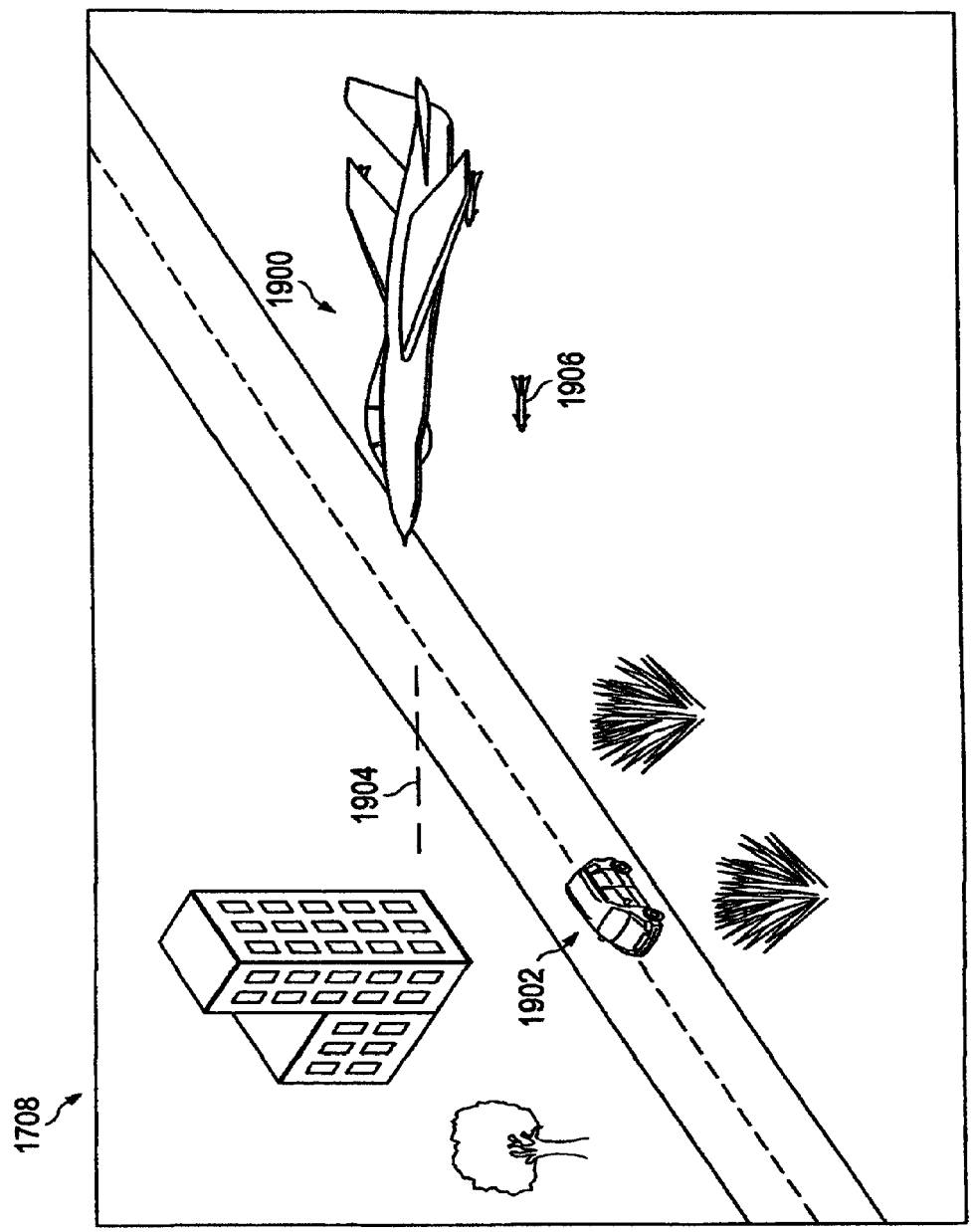
FIG. 19 is an example of one display including a plurality of objects that may be controlled as a function of a user selectively interrupting the beams of a controller.
Figure 2D:
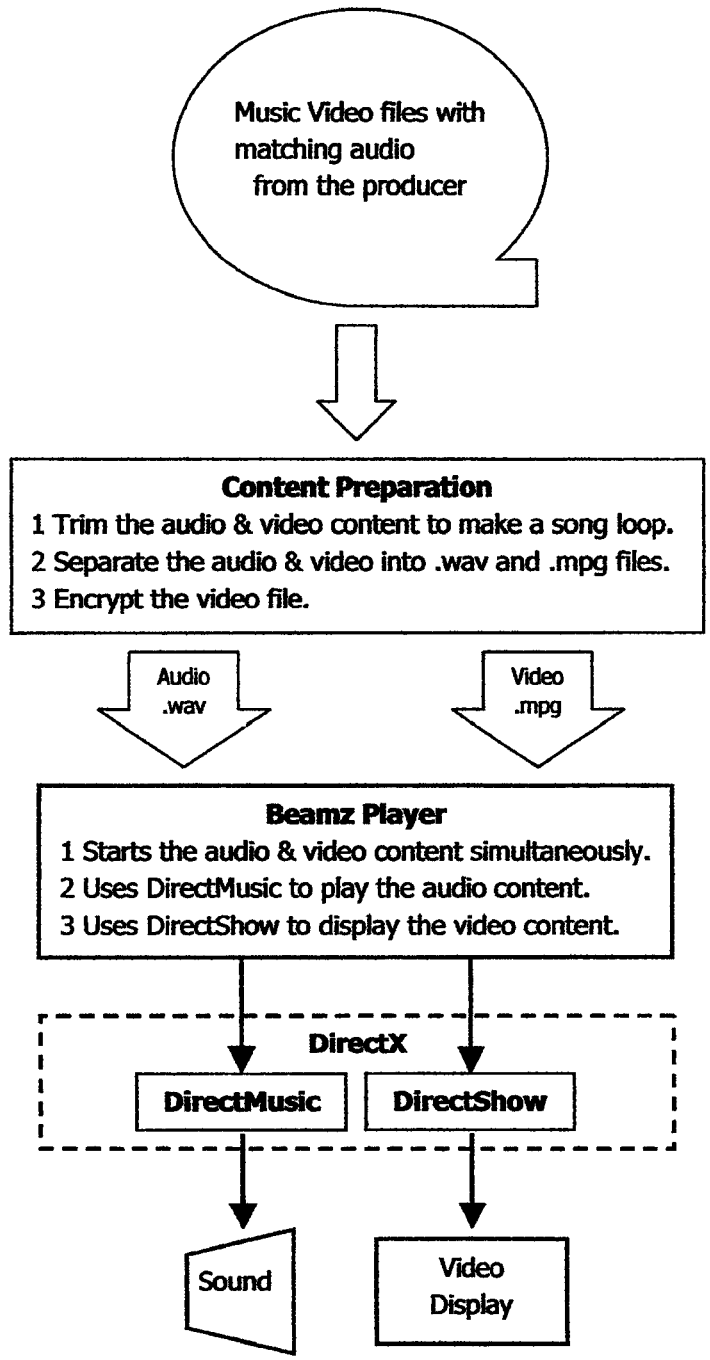

Advantageously, a user may hold the controller 1700, and without having to depress physical triggers, such as buttons, switches, levers or the like, motion one's fingers in the spatial area proximate the controller 1700 to selectively interrupt or not interrupt the beams 15 to freely manipulate and control the object(s) shown in FIG. 19. Considering that users, particular garners of video games, may spend relentless hours playing a game and can experience fatigue of one's hands or digits, the free manipulation of one's fingers to interact with electromagnetic beams, such as a visual or IR, provides an interesting and enjoyable experience, without the fatigue commonly incurred by video game enthusiast.

In a variation of this embodiment, the various beams 15 may be configured to control other instrumentalities, such as controlling the manipulation of an object that is visually rendered. Hence, the present invention is not directed just to video game displays, but also visual objects 1900 and 1902 that may comprise of other objects displayed on a display, such as a visual instrument like a string instrument, wind instrument or percussion.

Figure 18:
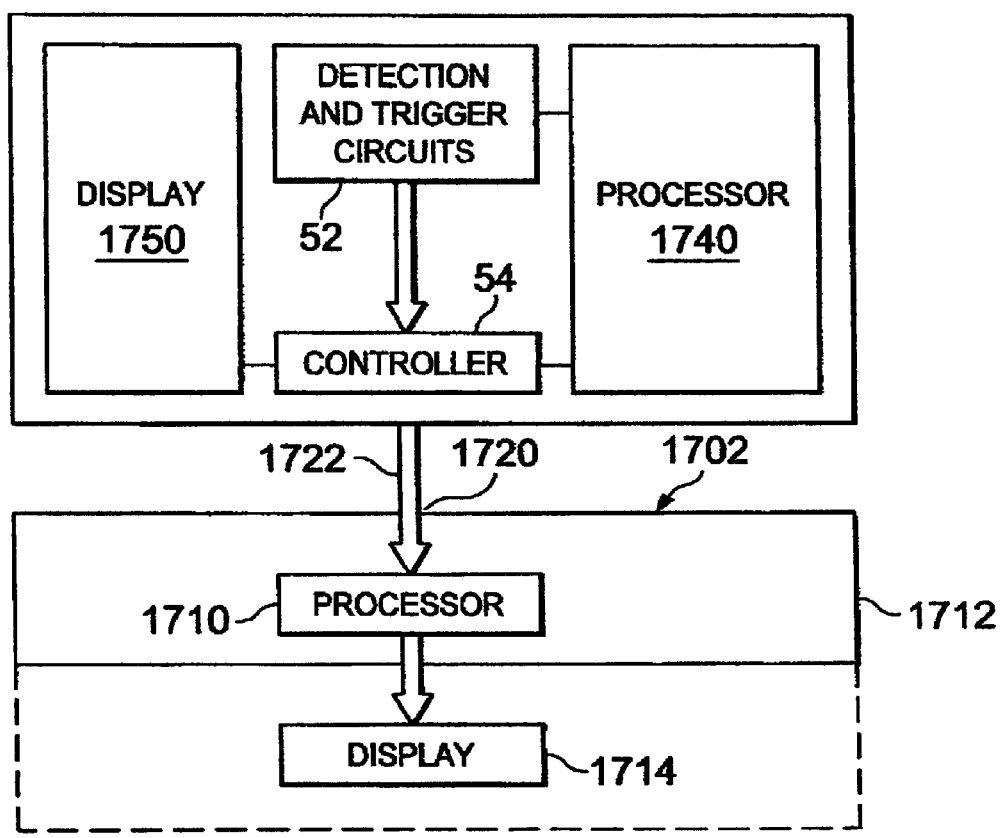
FIG. 18 is a block diagram of the controller of FIG. 17 configured to provide a plurality of control signals as a function of the interrupted beams to a processor which may control a display.

Referring to FIG. 18, there is shown a detailed block diagram of this embodiment of the invention whereby the controller 1700 includes the detection and trigger circuits 52 that are controlled, and responsive to, as a function of the interrupted or uninterrupted beams 16 as previously described. The outputs of these trigger circuits 52 provide respective control signals to the controller 54. In this embodiment, controller 54 controls or interacts with a physically remote processor 1710 in a housing 1712 controlling the visual rendition of objects 1900 and 1902 on a display 1714, which may or may not be physically integral to the housing 1712 including the processor 1710. Processor 1710 may be any kind of processor, such as a microprocessor, a microcontroller, or other logic controller, and may include a graphics processor configured to visually and spatially render objects on display as a function of the control signals provided on line 1702 to processor 1710.

The housing 1712 may be a gaming station, but may be of any type of control unit having a processor, configured to generate signals configured to generate or control images on display 1714. For instance, and not by way of limitation, the gaming console 1712 may be an X-BOX™ control station manufactured by Microsoft Corporation. Of course, other custom or off-the-shelf gaming consoles could be utilized as well. An interface 1720 of the console 1712 is configured to receive the plurality of control signals on line(s) 1722 from control 54, each control signal being created as a function of the interruption or non-interruption of the various beams 15 of controller 1700. The control signals generated by controller 54 may be analog or digital signals as desired. A single control signal generated by controller 54 may be generated as a function of multiple beams 15, such as to package more than one trigger event onto a single serial control line carrying the control signals.

Controller 1700 can be made and marketed separately from the console 1712 to provide the user an affordable controller that is configurable and usable with the console 1712, and may generate standardized signals. However, the control signals generated by controller 54 may also be custom control signals that are proprietary and compatible with the specific console 1712, these control signals being keyed or encrypted so that only authorized controllers 1700 may be utilized and operable with console 1712 for both security and/or proper operation thereof. The control signals generated on line 1722 may be generated as a function of, simultaneously, both the beams 15 as well as the mechanical switches 1708 shown in FIG. 17. The controller may be configured such that the user can select either using the beams 15 as control signals, or the switches 1708 individually, which is a function of the users choice. Thus, the controller 17 is truly flexible based on the users choice.

Referring back to FIG. 17, controller 17 may be configured, in one preferred embodiment, such that when a user's palm receives the respective member 1702, the respective forefinger may control the upper beam 15, and the ring finger may control the lower beam 15 such that each of these fingers can be manipulated without moving the hand grasping the controller. This simple manipulation of only two fingers without physically engaging any portion of the controller 1700 allows the user to manipulate and control the visual object 1900 and 1902 in a comfortable position. Referring to FIG. 19, the various beams 15 may be configured to control the visual objects 1900 and 1902 in 2-dimensions or 3-dimensions if desired. The various beams can control more than one object 1900 and 1902, simultaneously, and further control other objects that are related or are not related to the objects 1900 and 1902, for instance, changing the color of the screen, the contrast or other characteristics.

In yet a further embodiment of the present invention, the beams 15 may be configured to control both visually displayed objects 1900 and 1902, as well as audio signals, such as music, instruments or compositions. Thus, the controller 1700 may be configured to control video imaging as well as audio imaging, simultaneously, or alternatively, such that the controller 1700 is multimedia. In general, controller 1700 controls the imaging of the control signals, as taught throughout this patent application. Referring back to FIG. 18, the controller 1700 may further include its own processor 1740 configured to operatively control or configure the trigger circuits 52, as well as the beams 15, and the controller 54. This processor may be configured to further cooperate with the processor 1710 of the console 1712. In yet another embodiment of the present invention, the console 1712 may be dumbed-down to not include a processor 1710, whereby the processor 1740 in the unitary controller 1700 may control a separate display or even a display 1750 integral into the controller 1700 if desired. Thus, the controller 1700 may be one self-contained media device having controllable/configurable inputs including beams 15, a processor, and an integral display for one truly mobile solution.

In yet another embodiment of the invention, referring to FIGS. 17 and 18, and further in view of FIG. 20, there is shown a video jam song preparation and playback process. In this embodiment, the controller 54 of multi-media entertainment device 1700 is configured to enable a user to control individual sound elements of a music program while video, such as a musical performance, is displayed on display 1714 and which is correlated to the played sound elements. The user interacts with the triggers, such as the transmitter 26 and associated receiver 28, such as the laser beams 15 that can be interrupted by a players fingers to play music, such as particular instruments of a soundtrack. For instance, a music concert has a video track and a sound track. The video track is displayed on the display 1714, and the user controls the audio play of the sound track by interrupting the beams 15, where each beam is associated with a different instrument. For instance, one beam may control the guitar portion of the soundtrack, another beam may control the synthesizer portion, and another beam may control the drum portion. Each music portion is an individual music program of a pre-recorded song. The playback of each music portion is sympathetic to the other music portions, and is synchronized to each other. This allows the user to play the multimedia device 1700 along with a displayed video performance, in unison with one or more musicians displayed on a display, such as a TV or video projection system, such as to jam with the audio/video performance.

The user's play may be scored as a function of the user's accuracy of engaging the triggers 26/28 by breaking a particular beam 15 in time unison with the displayed video image. For instance, a user can strum a beam associated with a guitar music program in unison with a guitarist on the display and thus play the guitar program in synchronization with the guitarist on the display 1714. The music created by the user interacting with multiple beams is sympathetic and always synchronized to the video performance. If the user misses the timing of a note, for instance breaks the associated beam 15 early or late, the sound is not played. This prevents music from being played out of synchronization with the performer on the display. The user watches the video presentation of the video track and attempts to play the beams 15 in unison with the performer. This enables a user to develop rhythm should one need to develop or advance this skill. This is an entertaining activity, but also educational, therapeutic, and can even help those challenged in music, or be rehabilitated.

In another version, the video program such as that associated with a video game is displayed, and the user interacts by playing the triggers controlling sound elements associated with the displayed video game. Thus, the video program may be animated or computer generated and the term video program is not limited to an actual video performance such as a human concert. In one preferred embodiment, a computer generated game is displayed and the device 1700 can be used to control the action of a figure, such as a person, on the display. Breaking one particular beam 15 may result in creating both an action and also a sound. The sounds are a synchronized to the visual action, as also previously described in reference to FIGS. 17-19.

The following is a description of a video jam song preparation according to one preferred embodiment of the invention.

Video Jam Song Preparation

Music Videos with matching audio tracks are received from the publisher.

Programmers/composers do the following:
1. Trim each music video into a segment to corresponds to the master song loop (Rhythm Master).
2. Make two separate files (Audio & Video) that match each other.
3. Use a utility to encrypt the video file so that it cannot produce images when played by anything other than the composer's software.

Software VJAM Song Playback

Software of device 1700 imports and plays the audio (.wav) & video (.mpg) files separately. Playback of both files occurs simultaneously when the song is started.

The audio portion becomes the background Rhythm track and is "played" by the DirectMusic component of the Microsoft DirectX architecture as it does in all of songs utilized.

The device software disregards any audio content present in video files, and uses only the video material.

The Video portion is "played" by the DirectShow component of the Microsoft DirectX architecture.

DirectShow uses a filter in device 1700 to unencrypt the imagery and displays it in a separate window on the screen.

Since copy protection is only needed for licensed song material, the device software permits the general user to turn off the unencrypt filter allowing them to use their own (unencrypted) video material.

Because DirectMusic and DirectShow were designed to work together, the audio and video portions will remain synchronized if they are started at the same time. To accommodate inconsistencies that occur between the audio/video editing during preparation, the device software allows the composer to regulate the video start time with an offset value specified in milliseconds. The offset is applied to the moment when the (Master) audio instrument is started.

Video components (clips) can be made in sections just as movements in the musical (or audio) portion can be composed in separate sections. This allows (by using an advance trigger) the user to cause the order of the audio and video sections to be "re-arrangeable" at the player's demand.

An example might be—instructional music/videos for the teaching of Music Fundamentals—where a fundamental (such as "major scale in C") is explained with voiceover and corresponding picture and the user can next advance to a new section where he is instructed to play a composition (using the light beam triggers) based on the C major scale while seeing a video animation of a piano keyboard moving thru the notes of said scale. Then, with a wave of his hand, the player can move on to the next instruction (audio/video clip) or any other section in the chain of sections.

Through the above-described invention, a user can easily play music which is not disharmonious and exercise increasing control over the generation thereof. Although applicant has described applicant's preferred embodiments of the present invention, it will be understood that the broadest scope of this invention includes such modifications as diverse shapes, sizes, and materials. Further, many other advantages of applicant's invention will be apparent to those skilled in the art from the above descriptions, including the drawings, specification, appendix, and all other contents of this patent application and the related provisional patent application.

Figure 21:
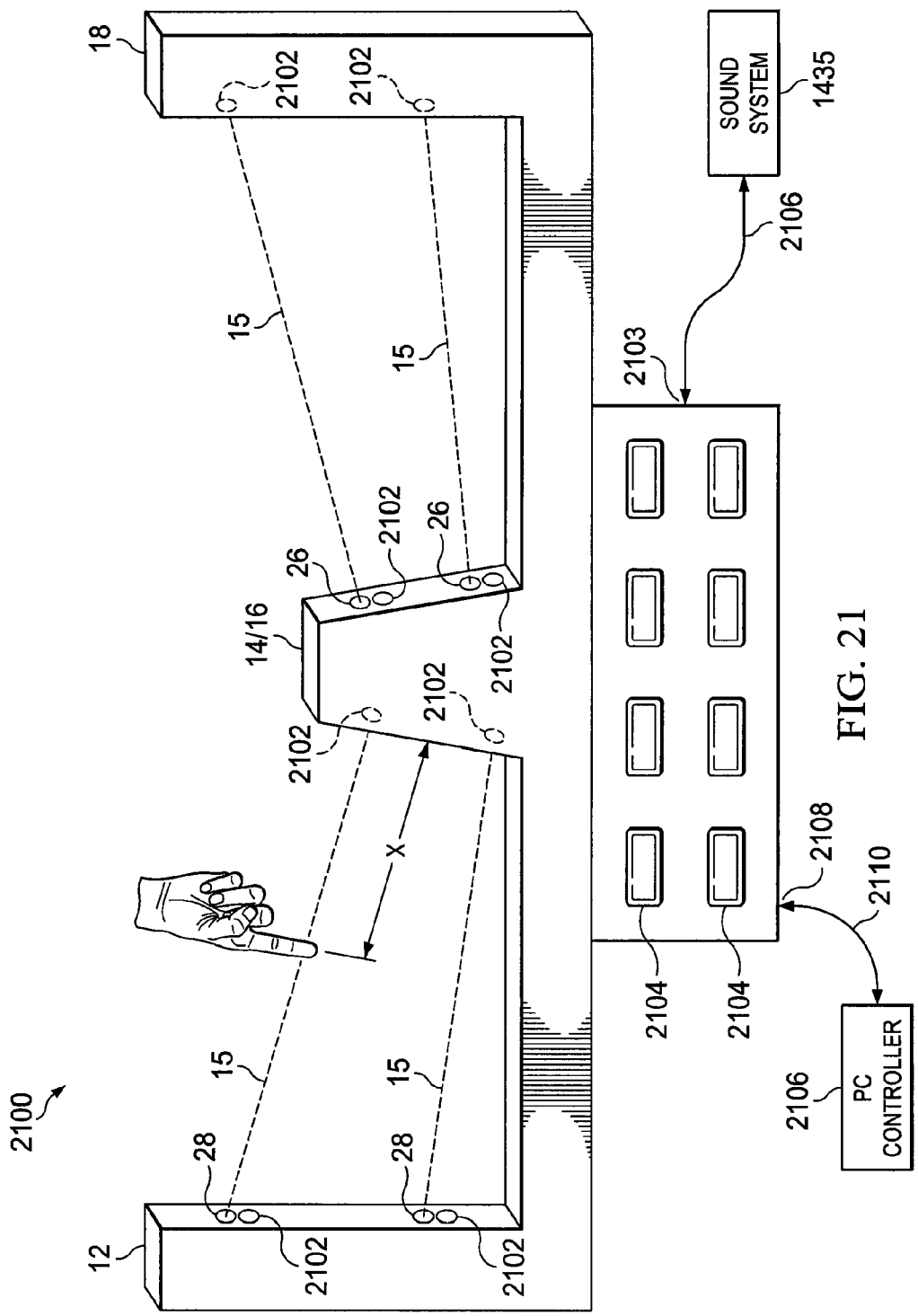
FIG. 21 is a perspective view of a controller including proximity sensors configured to generate proximity data in association with beams.

Referring now to FIG. 21 there is shown another preferred embodiment of the invention seen to comprise a controller 2100 having a proximity sensor 2102 positioned proximate and associated with each beam/sensor combination. As previously described in reference to FIGS. 1 and 17 wherein like numerals refer to like elements. Each beam element/transmitter 26 on post 14/16 directs an electromagnetic beam 15 toward an associated sensor 28 on an opposing respective post 12 and 18 to comprise a trigger, wherein breaking the beam 15 causes the associated sensor 28 to generate a signal indicative of the beam being broken. Advantageously, a proximity sensor 2102 is associated with each beam 15 and provides a signal indicative of where the associated beam is broken along the beam span, that is, the relative spatial position of the beam interruption. The relative position of the beam interruption is shown as distance X from the center post member 14/16 member. Alternatively, or in addition, the proximity sensors 2102 can be located on the outer posts 12 and 18. Knowing where the respective beam 15 is broken, such as by a user during utilization of controller 2100, adds a significant feedback signal that enables the controller 2100 to more dynamically generate control signals. The control signals are provided to an interface 2103 for communication to a remote device.

For instance, the controller 2100 can be configured as an entertainment device, such as a disc jockey (DJ) controller operable with a sound system 1435 via interface 2103 at a performance venue, as previously described in reference to FIG. 14. The position a beam is broken can correlate to a dynamic of a DJ control signal. The controller can be configured as a stand alone DJ controller, or a controller that operates in conjunction with a DJ controller. Alternatively, the controller can be configured to control an entertainment device, such as a video game system, to generate various video game control signals as previously described in reference to FIGS. 17-20. The position the beam is broken can correlate to a parameter of a video game control signal. The control signals generated by the controller with proximity sensing can take various forms, such analog or digital signals, and may comprise a MIDI signal or a sequence of MIDI signals, and limitation to the device controlled by controller 2100 is not to be inferred.

Controller 2100 is also shown configured with a plurality of bank buttons 2104 configured to generate control signals in addition to the sensor control signals, and the bank buttons may be configured to modify or control the type of control signals generated when an associated beam 15 is broken. Each of the beams 15 are selectively configurable to mimic a control such as used in an entertainment device. For instance, one of the beams 15 may be configurable to mimic a panning controller of a DJ player, wherein the extreme left position of the beam is one limit of the panning controller and the other end of the beam is the other limit. Each of the beams 15 is selectively configurable/programmable by a PC controller 2106 via a controller interface 2108 and cord 2110.

The controller 2100 has suitable software and/or firmware that is selectively configured by a user/programmer to mimic many other audio/visual controls. In the embodiment of a DJ player, the control signals could be configured as audio volume, panning, crossfading between turntable decks, controlling the amount of audio effects being applied, bending the pitch, bending the tempo, controlling EQ amounts (Hi/Md/Lo), scratching, and controlling lighting features including strobes, lasers and light banks. In the embodiment of a video controller and/or video gaming system, the control signals can control the direction/aim of a shooter, the rate of dispensed ammunition, movement of a player/visual object, selection of a video object, zoom in/out of a screen, screen selection, and so forth.

In an alternative embodiment, a single proximity sensor 2102 can be associated with each pair of beams 15 on one side of the controller 2100 to determine the position of a broken beam for each associated beam. In a preferred embodiment, the proximity sensor 2102 is a Vishay VCNL4020 digital output sensor that includes ambient light rejection, 100 Hz and a detection range specified to 200 mm with 16 bit effective resolution. Alternatively, an Avago APDS-9800 analog output sensor may be utilized that includes ambient light rejection and the ability to control a LED driving current in order to limit the detection range. Alternatively, an Avago APDS-09190 digital output sensor may be used that is factory calibrated to a 100 mm detection range. Limitation to the particular proximity sensor utilized is not to be inferred, but it is critical that the proximity sensor be operable in association with the sensors 28 to achieve sufficient control of the control signals.

MIDI Continuous Controller events were designed to capture the position of movable controls, such as wheels, knobs and sliders which, when moved, change their value. The controller 2100 is advantageously configured to transmit the generated beam proximity data as MIDI CC events with the values that correlate to where a beam 15 is being broken along its span, as previously described. All beam sensors 28 and proximity sensors 2102 generate a MIDI Note message when the associated beam 15 is broken. Likewise, all buttons 2104 send a MIDI Note message when pressed. Each of the proximity sensors 2102 send an Absolute MIDI Controller message that is a function of where the associated beam 15 was broken. The value range of the Absolute MIDI Controller message is 0-127, where 0 is extreme Left and 127 is extreme Right along the span of a beam. It is up to the target application/device how to use the continuous proximity values.

One example is configuring one beam 15 to mimic a knob or slider, as Continuous Controllers were designed to do. The generated MIDI Controller message is correlated to a position of the mimicked knob or slider. Another beam 15 can be configured to mimic another Continuous Controller, or even programmed to be a control creatively designed by a musician to enhance a performance. Much of what DJs do during a live performance involves manipulation controls, such as moving a knob or slider, which alters what the listener hears, or may see. Mapping beams 15 to a specific controls allows a DJ to visually and spatially represent what is being done to the music by moving his hand left and right, or up and down in 3-dimensions, within the span of the laser beam 15. Alternatively, the generated MIDI Controller message is correlated to, for instance, the rate of firing ammunition, or the movement of an object. Music and DJ Applications, video game controllers, and other entertainment devices, will find a host of ways to creatively use the beams with proximity controls as basic continuous controllers, and as more complex controllers as well.

Figure 22:
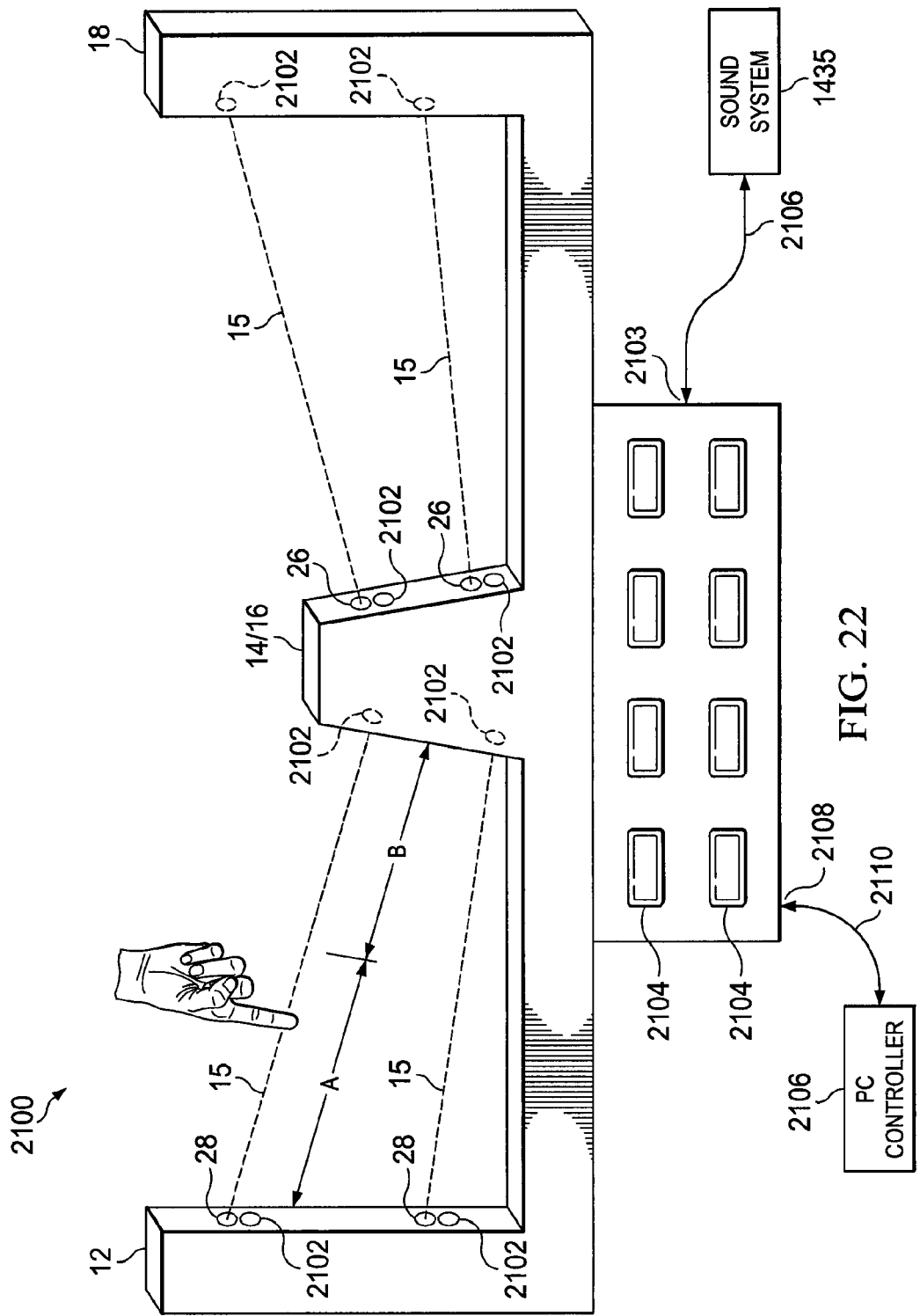
FIG. 22 is a perspective view of a controller with advance proximity sensing along a span of a beam.

One advanced configuration is shown in FIG. 22, where one or more beams 15 are virtually divided along the respective span of the beam 15 into proximity zones. Each proximity zone is configurable to being mapped to a different MIDI functions, such as shown as proximity Zone A mapped to generate a first MIDI message and proximity Zone 13 mapped to a second MIDI message. When a user interrupts the respective beam 15 in Zone A the first MIDI message is generated, and when the user interrupts the respective beam 15 in Zone B a different second MIDI message is generated. A different MIDI message having a different value may be generated as the user interrupts the beam 15 along the respective proximity zone. The proximity sensors 2102 are configured to detect beam 15 interrupted in both proximity Zones A and B simultaneously, such that the first and second MIDI messages are generated by controller 2100 simultaneously. The first and second MIDI messages may be related to each other.

Each of the beams 15 can be divided into two or more proximity zones, with each proximity zone mapped to a different function, although each different function can be related to another function. The number of proximity zones in one or more spans is determined by what can be practically used given the span width of the beam 15, the location of the beam, the technology employed, and other layout factors of the controller 2100. There are different ways the proximity zones can be used. One example in a DJ Player is a first proximity Zone A of a beam span 15 generating a MIDI event comprising a Transpose Offset value (semitones), which, when applied to the musical note being triggered by interrupting the beam, will produce a different note that is sympathetic to it. Breaking a beam 15 plays the transposed note for the zone. Moving a user's hand from left to right produces cascading sympathetic notes. Another example is each proximity zone containing a different MIDI event, related or unrelated, such as a music and/or lighting control event, which is transmitted when the beam is broken within it. Moving the user's hand from left to right cascades the MIDI events for each zone. In a video game controller, first proximity Zone A may control a weapon, and the second proximity Zone B may control the firing and/or rate of firing the associated weapon controlled in proximity Zone A. There are numerous possibilities for assigning the proximity zones of each beam to different control functions and attributes associated with the control functions.

Communications from controller 2100 to PC controller/host 2106—"Inbound" messages:

The following messages are used to report control object events from the controller 2100 to the PC Host and as a response to requests from the PC host. Each message type contains a Control Identifier field which identifies a controller 2100 object to which the message pertains. Each message type contains a data field which contains information about the current state or value of the control object.

HOME Version—Stand Alone MIDI Controller

End User functionality of the controller 2100 is determined by the Host software.

Button and Laser Response

The beams/lasers 15 and buttons 2104 have two states and the transitions between these states are reported to interface 2103 using MIDI note-on (when the button is depressed or the laser beam is broken) and note-off (when the button is released or the laser beam is restored). The field normally associated with note number is used to specify the Control ID. Note On messages with a velocity of 0 are equivalent to a Note off message.

MIDI messages by Beamz DJ Control:

| BDJ Control ID | Function | Ch. | Note | Dec. | Hex |
| --- | --- | --- | --- | --- | --- |
| Laser 1 | Trigger | 0 | C0 | 0 | X00 |
| Laser 2 | Trigger | 0 | C#0 | 1 | X01 |
| Laser 3 | Trigger | 0 | D0 | 2 | X02 |
| Laser 4 | Trigger | 0 | D#0 | 3 | X03 |
| Button 1 | Trigger | 0 | E0 | 4 | X04 |
| Button 2 | Trigger | 0 | F0 | 5 | X05 |
| Button 3 | Trigger | 0 | F#0 | 6 | X06 |
| Button 4 | Trigger | 0 | G0 | 7 | X07 |
| Button 5 | Trigger | 0 | G#0 | 8 | X08 |
| Button 6 | Trigger | 0 | A0 | 9 | X09 |
| Button 7 | Trigger | 0 | A#0 | 10 | X0A |
| Button 8 | Trigger | 0 | B0 | 11 | X0B |

Midi Messages - Bank (1)

PRO Version—Stand Alone MIDI Controller

End User functionality of the controller 2100 is determined by the Host software.

Button and Laser Response

The beams/lasers 15 and buttons 2104 have two states and the transitions between these states are reported to interface 2103 using MIDI note-on (when the button is depressed or the laser beam is broken) and note-off (when the button is released or the laser beam is restored). The field normally associated with note number is used to specify the Control ID. Note On messages with a velocity of 0 are equivalent to a Note off message.

| | | Bank 1 | | | | Bank 2 | | | | Bank 3 | | | | Bank 4 | | | |
| --- | --- | --- | --- | --- | --- | --- | --- | --- | --- | --- | --- | --- | --- | --- | --- | --- | --- |
| Control ID | Function | Ch | Note | Dec. | Hex | Ch | Note | Dec. | Hex | Ch | Note | Dec. | Hex | Ch | Note | Dec. | Hex |
| Laser 1 | Trigger | 0 | C0 | 0 | X00 | 1 | C0 | 0 | X00 | 2 | C0 | 0 | X00 | 3 | C0 | 0 | X00 |
| Laser 2 | Trigger | 0 | C#0 | 1 | X01 | 1 | C#0 | 1 | X01 | 2 | C#0 | 1 | X01 | 3 | C#0 | 1 | X01 |
| Laser 3 | Trigger | 0 | D0 | 2 | X02 | 1 | D0 | 2 | X02 | 2 | D0 | 2 | X02 | 3 | D0 | 2 | X02 |
| Laser 4 | Trigger | 0 | D#0 | 3 | X03 | 1 | D#0 | 3 | X03 | 2 | D#0 | 3 | X03 | 3 | D#0 | 3 | X03 |
| Button 1 | Trigger | 0 | E0 | 4 | X04 | 1 | E0 | 4 | X04 | 2 | E0 | 4 | X04 | 3 | E0 | 4 | X04 |
| Button 2 | Trigger | 0 | F0 | 5 | X05 | 1 | F0 | 5 | X05 | 2 | F0 | 5 | X05 | 3 | F0 | 5 | X05 |

-continued

|  |  | Bank 1 | | | | Bank 2 | | | | Bank 3 | | | | Bank 4 | | | |
|---|---|---|---|---|---|---|---|---|---|---|---|---|---|---|---|---|---|
| Control ID | Function | Ch | Note | Dec. | Hex | Ch | Note | Dec. | Hex | Ch | Note | Dec. | Hex | Ch | Note | Dec. | Hex |
| Button 3 | Trigger | 0 | F#0 | 6 | X06 | 1 | F#0 | 6 | X06 | 2 | F#0 | 6 | X06 | 3 | F#0 | 6 | X06 |
| Button 4 | Trigger | 0 | G0 | 7 | X07 | 1 | G0 | 7 | X07 | 2 | G0 | 7 | X07 | 3 | G0 | 7 | X07 |
| Button 5 | Bank 1 (*) | 15 | G#0 | 8 | X08 | 15 | G#0 | 8 | X08 | 15 | G#0 | 8 | X08 | 15 | G#0 | 8 | X08 |
| Button 6 | Bank 2 (*) | 15 | A0 | 9 | X09 | 15 | A0 | 9 | X09 | 15 | A0 | 9 | X09 | 15 | A0 | 9 | X09 |
| Button 7 | Bank 3 (*) | 15 | A#0 | 10 | X0A | 15 | A#0 | 10 | X0A | 15 | A#0 | 10 | X0A | 15 | A#0 | 10 | X0A |
| Button 8 | Bank 4 (*) | 15 | B0 | 11 | X0B | 15 | B0 | 11 | X0B | 15 | B0 | 11 | X0B | 15 | B0 | 11 | X0B |

(*) Pressing a Bank Button makes the associated Bank of MIDI messages become active.

After it is pressed, the Bank button will stay illuminated to indicate which Bank is being transmitted.

A MIDI message is also sent to indicate that the button was pressed. (Same for all four banks).

Proximity Data

As previously described, the controller 2100 is configured such that each beam/laser 15 is equipped with the ability to determine where a laser beam is broken along its span, and to transmit this measurement in the form of a MDI Continuous Controller Absolute value provided to interface 2103.

The field normally associated with MIDI controller number is used to specify the BDJ control ID.

For example, in a DJ controller, the value transmitted mimics a standard MIDI Panning controller in the respect that a value of 0 represents the extreme Left position while a value of 127 represents the extreme Right. In a video game controller, the value 0 represents an ammunition delivery rate of 0, while the value 127 represents a maximum rate of ammunition delivery, such as 10 rounds a second.

While a beam remains broken, the Proximity value is re-transmitted to reflect ongoing changes in location.

Multiple lasers can be tracked simultaneously.

Figure 23:
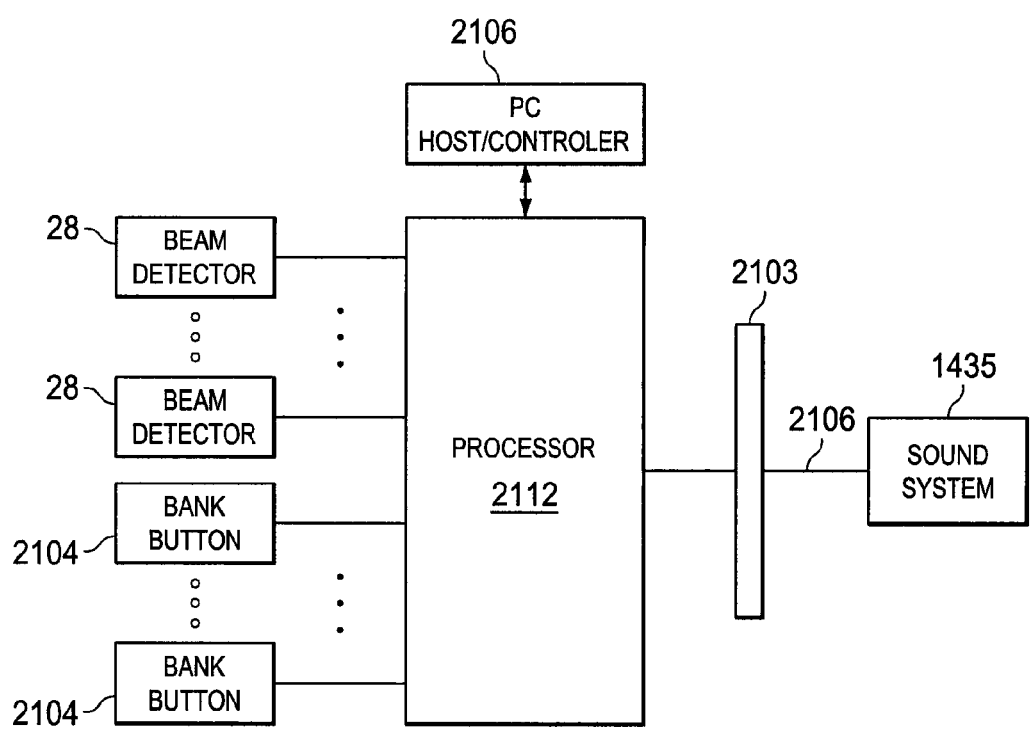
FIG. 23 is a block diagram of the controller of FIGS. 21 and 22.

FIG. 23 depicts a block diagram of controller 2100 including the various features as previously described, and including a processor 2112 configured with software/firmware, which includes internal memory, configured to map the associated beams 15 and buttons 2104 and generate MIDI messages as described above.

The invention claimed is:

1. A device configured to control an entertainment device, comprising:
   at least one trigger responsive to a selectively positionable member relative to, and spatially separated from, the at least one trigger; and
   a controller responsive to the at least one trigger and configured to generate at least one control signal, the at least one control signal comprising a MIDI message configured to variably control a parameter of an audio signal or a visual signal as a function of a relative proximity of the member to the at least one trigger, wherein the MIDI message varies as the proximity of the member varies with respect to the at least one trigger, wherein the at least one trigger comprises an electronic beam having a span comprising a first proximity zone and a second proximity zone, wherein the at least one trigger is configured to generate a first said MIDI message when the member is positioned in the first proximity zone, and a second said MIDI message when the member is positioned in the second proximity zone.

2. The device as specified in claim 1 wherein the at least one control signal is configured to control a DJ player.

3. The device as specified in claim 2 wherein the at least one control signal is configured to control a light generating apparatus.

4. The device as specified in claim 1 further comprising:
   a plurality of electronic programs, the controller configured to generate a plurality of the MIDI message as a function of the plurality of electronic programs and the plurality of triggers.

5. The device as specified in claim 2 further comprising:
   a plurality of electronic programs, the controller configured to generate a plurality of the MIDI message as a function of the plurality of electronic programs and the plurality of triggers.

6. The device as specified in claim 4 wherein each said electronic program comprises sound elements comprising a subset of a musical composition.

7. The device as specified in claim 4 wherein one of the plurality of electronic programs is associated with one of the at least one trigger.

8. The device as specified in claim 7 wherein the electronic programs are configured to be selectively associated with the one of the plurality of triggers.

9. The device as specified in claim 4 wherein the plurality of MIDI messages are configured to generate synchronized audible musical sounds as a function of the at least one trigger.

10. The device as specified in claim 9 wherein when one of the triggers is in a first state for a prolonged period of time the MIDI messages are configured to generate successive said audible musical sounds.

11. The device specified in claim 5 wherein the controller is configured to selectively associate one of the electronic programs with one of a plurality of controls of the DJ player.

12. The device as specified in claim 5 wherein the electronic programs each comprise sound elements, wherein the sound elements of each said electronic program are correlated to the sound elements of another said electronic program.

13. The device as specified in claim 12 wherein the sound elements are a subset of a musical composition.

14. The device as specified in claim 2 comprising a plurality of said triggers each configured to be controlled by a user.

15. The device as specified in claim 14 wherein the plurality of said triggers each include an electromagnetic beam.

16. The device as specified in claim 15 wherein the plurality of triggers are configured to be controlled by a user's finger.

17. The device as specified in claim 16 wherein the plurality of said triggers are configured such that they can be simultaneously controlled by one hand of a user.

18. The device as specified in claim 1 wherein the first MIDI message and the second MIDI message correspond to different MIDI events.

19. The device as specified in claim 18 wherein the first MIDI message and the second MIDI message are configured to be generated simultaneously.

20. A computer readable medium including computer executable instructions configured to control an entertainment device, including instructions responsive to at least one trigger responsive to a selectively positionable member relative to the at least one trigger, the member spatially separated from the at least one trigger, wherein the at least one trigger comprises an electronic beam having a span comprising a first proximity zone and a second proximity zone, wherein the instructions are configured to generate a first said MIDI message when the member is positioned in the first proximity zone, and a second said MIDI message when the member is positioned in the second proximity zone; and instructions configured to generate at least one control signal as a function of the at least one trigger, the at least one control signal comprising a MIDI message configured to variably control a parameter of an audio signal or a visual signal as a function of a relative proximity of the member to the at least one trigger, wherein the MIDI message varies as the proximity of the member varies with respect to the at least one trigger.

21. The computer readable medium as specified in claim 20 wherein the at least one control signal is configured to control a DJ player.

22. The computer readable medium as specified in claim 21 wherein the at least one control signal is configured to control a light generating apparatus.

23. The computer readable medium as specified in claim 20 further comprising:

instructions for operating a plurality of electronic programs and configured to generate a plurality of the MIDI message as a function of the plurality of electronic programs and the plurality of triggers.

24. The computer readable medium as specified in claim 21 further comprising:

instructions for operating a plurality of electronic programs and configured to generate a plurality of the MIDI message as a function of the plurality of electronic programs and the plurality of triggers.

25. The computer readable medium as specified in claim 23 wherein each said electronic program comprises sound elements comprising a subset of a musical composition.

26. The computer readable medium as specified in claim 23 including instructions for selectively associating one of the plurality of electronic programs with one of the at least one trigger.

27. The computer readable medium as specified in claim 23 including instructions configuring the plurality of MIDI messages to generate synchronized audible musical sounds as a function of the at least one trigger.

28. The computer readable medium specified in claim 21 including instructions configured to selectively associate one of the electronic programs with one of a plurality of controls of the DJ player.

29. The computer readable medium as specified in claim 21 wherein the electronic programs each comprise sound elements, including instructions such that the sound elements of each said electronic program are correlated to the sound elements of another said electronic program.

30. The computer readable medium as specified in claim 29 wherein the sound elements are a subset of a musical composition.

31. The computer readable medium as specified in claim 21 including instructions enabling a plurality of said triggers to be configured to be controlled by a user.

32. The computer readable medium as specified in claim 31 wherein the plurality of triggers are configured to be controlled by a user's finger.

33. The device as specified in claim 21 wherein the first MIDI message and the second MIDI message correspond to different MIDI events.

34. The device as specified in claim 33 wherein the first MIDI message and the second MIDI message are configured to be generated simultaneously.

* * * * *